United States Patent
Caveney et al.

(10) Patent No.: US 8,620,517 B2
(45) Date of Patent: Dec. 31, 2013

(54) VEHICULAR PLATOONING USING DISTRIBUTED RECEDING HORIZON CONTROL

(75) Inventors: Derek Stanley Caveney, Plymouth, MI (US); William Bruce Dunbar, Santa Cruz, CA (US)

(73) Assignee: Toyota Mototr Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/401,090

(22) Filed: Feb. 21, 2012

(65) Prior Publication Data

US 2013/0218365 A1 Aug. 22, 2013

(51) Int. Cl.
*G06F 19/00* (2011.01)

(52) U.S. Cl.
USPC .......................................................... 701/31.5

(58) Field of Classification Search
None
See application file for complete search history.

(56) References Cited

U.S. PATENT DOCUMENTS

| | | | |
|---|---|---|---|
| 5,777,451 A | 7/1998 | Kobayashi et al. | |
| 6,032,097 A | 2/2000 | Iohoshi et al. | |
| 7,979,173 B2 | 7/2011 | Breed | |
| 8,352,111 B2 * | 1/2013 | Mudalige | 701/24 |
| 8,352,112 B2 * | 1/2013 | Mudalige | 701/24 |
| 8,401,737 B2 * | 3/2013 | Aso | 701/42 |
| 2008/0040023 A1 | 2/2008 | Breed et al. | |
| 2010/0256835 A1 * | 10/2010 | Mudalige | 701/2 |
| 2010/0256836 A1 * | 10/2010 | Mudalige | 701/2 |
| 2010/0256852 A1 * | 10/2010 | Mudalige | 701/24 |
| 2011/0270514 A1 | 11/2011 | Shida | |

FOREIGN PATENT DOCUMENTS

| | | |
|---|---|---|
| JP | 2007-233965 | 9/2007 |
| JP | 2007233965 | 9/2007 |
| JP | 2008-207729 | 9/2008 |
| JP | 2008207729 A | 9/2008 |
| JP | 2010-244346 | 10/2010 |
| JP | 2010244346 A | 10/2010 |
| WO | WO 2004/077378 A1 | 9/2004 |

OTHER PUBLICATIONS

Stankovic, S.S.; Stanojevic, M.J.; Siljak, D.D.; , "Decentralized Overlapping Control of a Platoon of Vehicles," IEEE Transactions on Control Systems Technology, vol. 8, No. 5, pp. 816-832, Sep. 2000.

(Continued)

*Primary Examiner* — Thomas Tarcza
*Assistant Examiner* — Adam Alharbi
(74) *Attorney, Agent, or Firm* — Oblon, Spivak, McClelland, Maier & Neustadt, L.L.P.

(57) ABSTRACT

This disclosure relates to distributed control of a platoon of vehicles with nonlinear dynamics. Distributed receding horizon control algorithms are presented to derive sufficient conditions that guarantee asymptotic stability, leader-follower string stability, and predecessor-follower string stability, following a step speed change in the platoon. Vehicles compute their own control in parallel, and receive communicated position and velocity error trajectories from their immediate predecessor. Leader-follower string stability requires additional communication from the lead car at each update, in the form of a position error trajectory. Communication from the lead car is required only once at initialization. Provided an initially feasible solution can be found, subsequent feasibility of the algorithms are guaranteed at every update. The theory is generalized for nonlinear decoupled dynamics, and is thus applicable to fleets of planes, robots, or boats, in addition to cars.

16 Claims, 9 Drawing Sheets
(5 of 9 Drawing Sheet(s) Filed in Color)

(56) References Cited

OTHER PUBLICATIONS

Stankovic et al., "Decentralized Overlapping Control of a Platoon of Vehicles," IEEE Transactions on Control Systems Technology, vol. 8, No. 5, Sep. 2000, pp. 816-832.

Acar, "Boundaries of the Receding Horizon Control for Interconnected Systems," Journal of Optimization Theory and Applications, vol. 84, No. 2, Feb. 1995, pp. 251-271.

Camponogara et al., "Distributed Model Predictive Control," IEEE Control Systems Magazine, Feb. 2002, pp. 44-52.

Chen and Allgower, "A Quasi-Infinite Horizon Nonlinear Model Predictive Control Scheme with Guaranteed Stability," Automatica, vol. 34, No. 10, 1998, pp. 1205-1217.

Dunbar, "Distributed Receding Horizon Control of Multiagent Systems," PhD Thesis, California Institute of Technology, 2004, 181 pages.

Dunbar, "Distributed Receding Horizon Control of Dynamically Coupled Nonlinear Systems," IEEE Transactions on Automatic Control, vol. 52, No. 7, Jul. 2007, pp. 1249-1263.

Dunbar and Murray, "Distributed Receding Horizon Control for Multi-Vehicle Formation Stabilization," Automatica, 42(4), 2006, 10 pages.

Falcone et al., "Low Complexity MPC Schemes for Integrated Vehicle Dynamics Control Problems," Proceedings of the $9^{th}$ International Symposium on Advanced Vehicle Control (AVEC'08), 2008, 6 pages.

Franco et al., "Cooperative Constrained Control of Distributed Agents With Nonlinear Dynamics and Delayed Information Exchange: A Stabilizing Receding-Horizon Approach," IEEE Transactions on Automatic Control, vol. 53, No. 1, Feb. 2008, pp. 324-338.

Jovanovic and Bamieh, "On the Ill-Posedness of Certain Vehicular Platoon Control Problems," IEEE Transactions on Automatic Control, vol. 50, No. 9, Sep. 2005, pp. 1307-1321.

Keviczky et al., "Decentralized Receding Horizon Control for Large Scale Dynamically Decoupled Systems," Automatica, 42(12), Dec. 2006, 11 pages.

Kohut et al., "Integrating Traffic Data and Model Predictive Control to Improve Fuel Economy," Proceeding fo the $12^{th}$ IFAC Symposium on Control in Transportation Systems, 2009, 6 pages.

Kuwata et al., "Distributed Robust Receding Horizon Control for Multivehicle Guidance," IEEE Transactions on Control Systems Technology, vol. 15, No. 4, Jul. 2007, pp. 627-641.

Liu et al., "Distributed model predictive control of nonlinear systems subject to asynchronous and delayed measurements," Automatica, 46(1), 2010, pp. 52-61.

Mayne et al., "Constrained model predictive control: Stability and optimality," Automatica, 36, 2000, pp. 789-814.

Michalska and Mayne, "Robust Receding Horizon Control of Constrained Nonlinear Systems," IEEE Transactions on Automatic Control, vol. 38, No. 11, Nov. 1993, pp. 1623-1633.

Motee and Sayyar-Rodsari, "Optimal Partitioning in Distributed Model Predictive Control," Proceedings of the IEEE American Control Conference, 2003, pp. 5300-5305.

Swaroop and Hedrick, "String Stability of Interconnected Systems," IEEE Transactions on Automatic Control, vol. 41, No. 3, Mar. 1996, pp. 349-357.

Richards and How, "Robust Model Predictive Control with Imperfect Information," 2005, 6 pages.

Saerens et al., "Model Predictive Control of Automotive Powertrains—First Experimental Results," Proceedings of the $47^{th}$ IEEE Conference on Decision and Control, Dec. 2008, pp. 5692-5697.

Schwartz and Milam, "On-line Path Planning for an Autonomous Vehicle in an Obstacle Filled Environment," Proceedings of the $47^{th}$ IEEE Conference on Decision and Control, Dec. 2008, pp. 2806-2813.

Shamma and Arslan, "A Decomposition Approach to Distributed Control of Spatially Invariant Systems," IEEE Transactions on Automatic Control, vol. 51, No. 4, Apr. 2006, pp. 701-707.

Venkat et al., "Stability and optimality of distributed model predictive control," Proceedings of the $44^{th}$ IEEE Conference on Decision and Control, and the European Control Conference, 2005, pp. 6680-6685.

\* cited by examiner

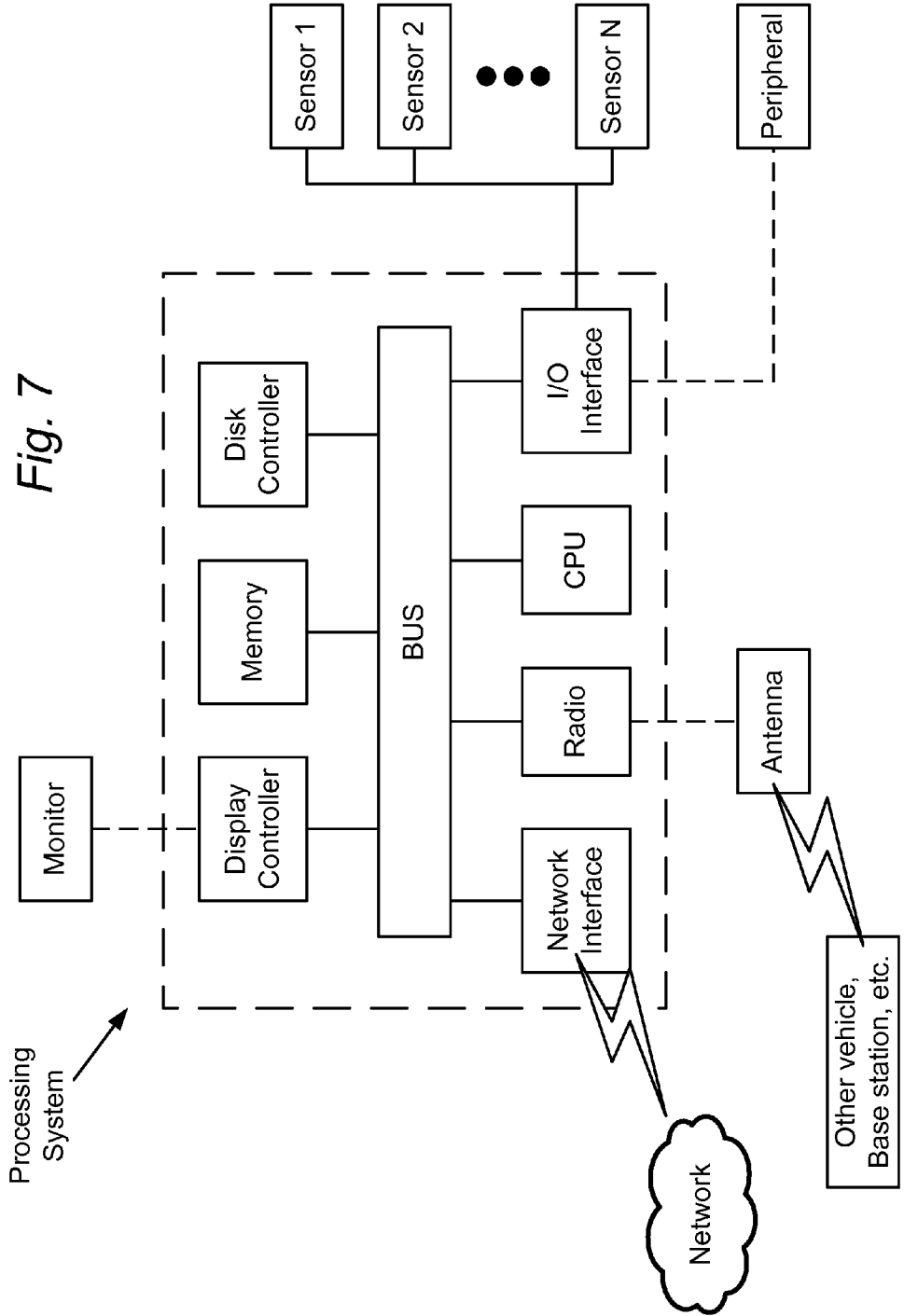

VEHICULAR PLATOONING USING DISTRIBUTED RECEDING HORIZON CONTROL

BACKGROUND OF THE INVENTION

This disclosure relates to platoon control of vehicles.

The "background" description provided herein is for the purpose of generally presenting the context of the disclosure. Work described herein, to the extent it is described in this background section, as well as aspects of the description which may not otherwise qualify as prior art at the time of filing, are neither expressly or impliedly admitted as prior art.

Aspects of this disclosure build upon the teachings of the following references, which are referred to throughout:

[1] L. Acar. Boundaries of the receding horizon control for interconnected systems. Journal of Optimization Theory and Applications, 84(2), 1995.

[2] J. T. Betts. Practical Methods for Optimal Control Using Nonlinear Programming. SIAM, 2001.

[3] E. Camponogara, D. Jia, B. H. Krogh, and S. Talukdar. Distributed model predictive control. IEEE Control Systems Magazine, February, 2002.

[4] H. Chen and F. Allgcewer. A quasi-infinite horizon nonlinear model predictive scheme with guaranteed stability. Automatica, 14(10):1205-1217, 1998.

[5] W. B. Dunbar. Distributed Receding Horizon Control of Multiagent Systems. PhD thesis, California Institute of Technology, Pasadena, Calif., 2004.

[6] W. B. Dunbar. Distributed receding horizon control of dynamically coupled nonlinear systems. IEEE Trans. on Automatic Control, 52(7):1249-1263, 2007.

[7] W. B. Dunbar and R. M. Murray. Distributed receding horizon control for multi-vehicle formation stabilization. Automatica, 42(4):549-558, 2006.

[8] P. Falcone, F. Borrelli, E. H. Tseng, J. Asgari, and H. Davor. Low complexity MPC schemes for integrated vehicle dynamics control problems. In Proceedings of the 9th International Symposium on Advanced Vehicle Control (AVEC '08), pages 875-880, 2008.

[9] E. Franco, L. Magni, T. Parisini, M. M. Polycarpou, and D. M. Raimondo. Cooperative constrained control of distributed agents with nonlinear dynamics and delayed information exchange: A stabilizing receding-horizon approach. IEEE Trans. on Automatic Control, 53(1):324-338, 2008.

[10] M. R. Jovanovic and B. Bamieh. On the ill-posedness of certain vehicular platoon control problems. IEEE Transactions on Automatic Control, 50(9):4583-4588, 2005.

[11] T. Keviczky, F. Borrelli, and G. J. Balas. Decentralized receding horizon control for large scale dynamically decoupled systems. Automatica, 42(12):2105-2115, December 2006.

[12] N. J. Kohut, J. K. Hedrick, and F. Borrelli. Integrating traffic data and model predictive control to improve fuel economy. In Proceeding of 12th IFAC Symposium on Control in Transportation Systems, pages 2806-2813, 2009.

[13] Y. Kuwata, A. G. Richards, T. Schouwenaars, and J. P. How. Distributed robust receding horizon control for multi-vehicle guidance. IEEE Transactions on Control Systems Technology, 15(4), July 2007.

[14] Jinfeng Liu, David Munoz de la Pena, and Panagiotis D. Christofides. Distributed model predictive control of nonlinear systems subject to asynchronous and delayed measurements. Automatica, 46(1):52-61, 2010.

[15] D. Q. Mayne, J. B. Rawlings, C. V. Rao, and P. O. M. Scokaert. Contrained model predictive control: Stability and optimality. Automatica, 36:789-814, 2000.

[16] H. Michalska and D. Q. Mayne. Robust receeding horizon control of contrained nonlinear systems. IEEE Trans. Auto. Contr., 38:1623-1632, 1993.

[17] N. Motee and B. Sayyar-Rodsari. Optimal partitioning in distributed model predictive control. In Proceedings of the IEEE American Control Conference, 2003.

The automotive industry is embracing receding horizon control research for powertrain [19] and vehicle stability [8] applications. Furthermore, this research is being applied to path planning applications for autonomous driving [20] and eco-driving [12].

Literature on distributed receding horizon control has examined coupled subsystem dynamics for linear dynamics [1], [3], [17], [23] and nonlinear dynamics [6], [14]. Distributed receding horizon control of multiple decoupled vehicles has also been explored for linear [13], [18] and nonlinear [7], [9], [11] vehicle dynamics, with coupling in cost functions and/or constraints.

BRIEF SUMMARY OF THE INVENTION

This disclosure considers the problem of distributed control of a platoon of vehicles with nonlinear dynamics. Distributed receding horizon control algorithms are presented to derive sufficient conditions that guarantee asymptotic stability, leader-follower string stability, and predecessor-follower string stability, following a step speed change in the platoon. Vehicles compute their own control in parallel, and receive communicated position and velocity error trajectories from their immediate predecessor. Leader-follower string stability requires additional communication from the lead car at each update, in the form of a position error trajectory. Predecessor-follower string stability, as defined herein, implies leader-follower string stability. Predecessor-follower string stability requires stricter constraints in the local optimal control problems than the leader-follower formulation, but communication from the lead car is required only once at initialization. Provided an initially feasible solution can be found, subsequent feasibility of the algorithms are guaranteed at every update. The theory is generalized for nonlinear decoupled dynamics, and is thus applicable to fleets of planes, robots, or boats, in addition to cars. A simple 7-car simulation examines parametric tradeoffs that affect stability and string stability. Platoon formation, heterogeneity and size (length) are also considered, resulting in intuitive tradeoffs between lead car and following car control flexibility.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the disclosed embodiments and many of the attendant advantages thereof will be readily obtained as the same becomes better understood by reference to the following detailed description when considered in connection with the accompanying drawings, wherein:

FIG. 7 is a schematic of a processing system according to embodiments of this disclosure.

DETAILED DESCRIPTION OF THE INVENTION

I. Introduction

Figure 1:
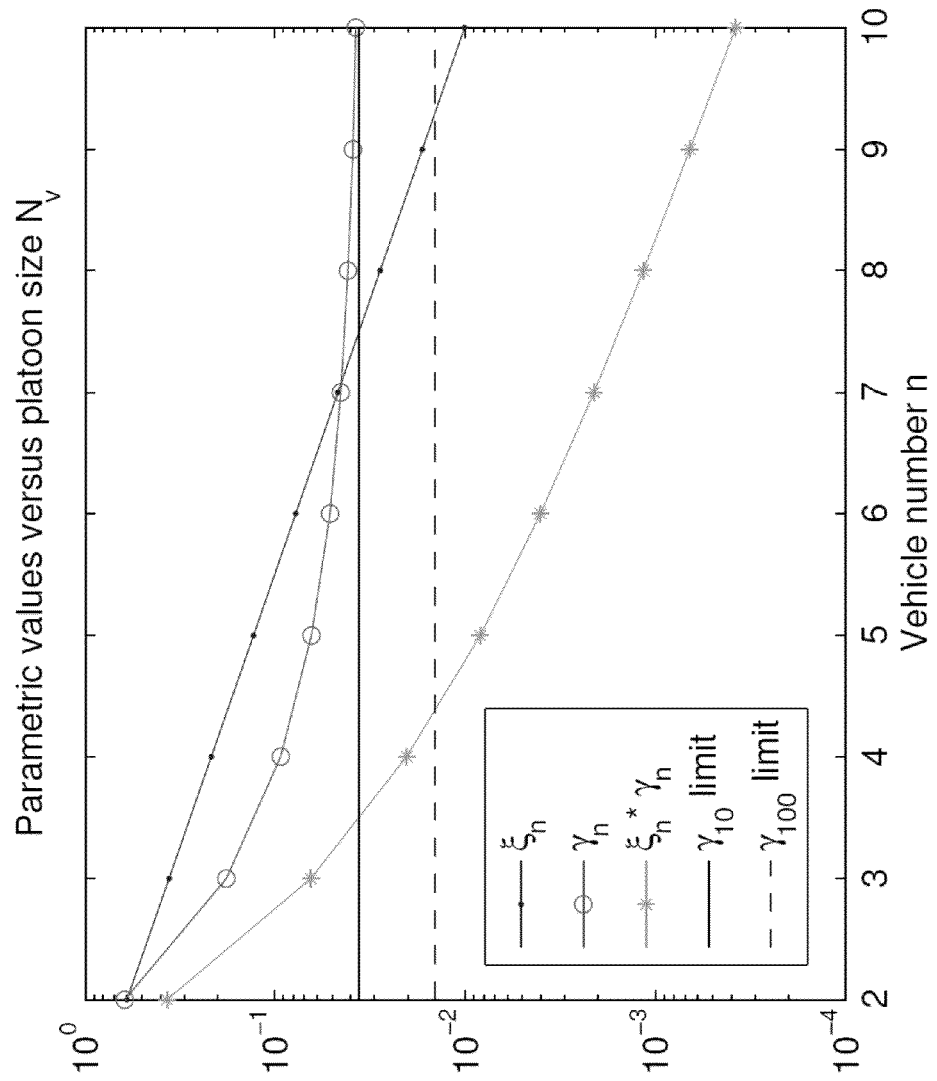
FIG. 1 is a plot of values for $\xi_n, \gamma_n$ and combined parameter $\xi_n \gamma_n$ versus a vehicle number n, using equation (38). The plot is shown for up to 10 vehicles and setting p=0.99 and $\epsilon$=0.6, parameters defined in Lemma IV.4. The $\gamma_{10}$ and $\gamma_{100}$ limits were computed as described in the detailed description.

This disclosure relates to the control of a platoon of dynamically decoupled vehicle systems that are required to stably and cooperatively perform group speed changes. In particular, the closed-loop response must be string stable to ensure attenuation of the closed-loop position error, from the first to the last vehicle in the platoon. Receding horizon control is explored [15], in which the current control action is determined by solving online, at each sampling instant, a finite-horizon optimal control problem. In continuous-time formulations, each optimization yields an open-loop control trajectory and the initial portion of the trajectory is applied to the system until the next receding horizon update time. For the problem of interest here, cooperation between subsystems can be incorporated in the optimal control problem by including coupling terms in the cost function or constraints, as done in [7], [11]. Herein, a distributed receding horizon controller is presented in which each vehicle is assigned its own optimal control problem, optimizes only for its own control during each update period, and transmits and receives information only with the vehicle behind and ahead, respectively. For the purpose of establishing string stability, communication with the platoon's lead car is also required, but only in the form of position and speed error trajectories, i.e., no information about the lead car's acceleration or control profile is required for string stability. This is one way in which the controller described herein is different than the existing string-stabilizing controllers.

The automotive industry is embracing receding horizon control research for powertrain [19] and vehicle stability [8] applications. Furthermore, this research is being applied to path planning applications for autonomous driving [20] and eco-driving [12]. However, this disclosure is the first to apply distributed receding horizon control to the automotive domain.

The convergence of advanced global positioning technologies, prototype vehicle-to-vehicle communication, and increased on-board computation capabilities has allowed academia and industry to explore the possibilities of cooperative control between cars. In principle, distributed receding horizon control enables cooperative control by providing implicit robustness to communication dropouts, enforcing constraints on allowable vehicle motion, and sharing predicted paths between vehicles. Global positioning further enables cooperative control through the existence of a common global clock and inertial coordinate frame.

Literature on distributed receding horizon control has examined coupled subsystem dynamics for linear dynamics [1], [3], [17], [23] and nonlinear dynamics [6], [14]. Distributed receding horizon control of multiple decoupled vehicles has also been explored for linear [13], [18] and nonlinear [7], [9], [11] vehicle dynamics, with coupling in cost functions and/or constraints.

This disclosure is the first to address string stability of vehicle platoons with nonlinear dynamics using distributed receding horizon control. String stability is not surveyed herein, much of which is applicable to linear dynamics, but the seminal paper by Swaroop and Hedrick (D. Swaroop and J. K. Hedrick, "String Stability of Interconnected Systems," IEEE Transactions on Automatic Control, vol. 41, pp. 349-357, 1996) is applicable to a countably infinite number of vehicles with nonlinear dynamics [22]. By comparison with other string stable controllers, receding horizon control has the often cited advantage that a variety of constraints on the states and inputs can in principle be accommodated. We note that there are other methods such as controlled invariance that can handle saturation in the inputs while addressing platoon stability for spatially invariant systems [21], such as vehicle platoon with identical linear vehicle dynamics.

The platoon stabilizing controller examined here is an improvement over [7]. In [7], controller updates were assumed to happen instantaneously and synchronously, whereas the method here allows dedicated times for communication and computation during each update period, with permission of local steps to be asynchronous provided the time stamps for the start of update periods to be globally common (which can be facilitated by a GPS-based clock, for example). As in [6], [7], vehicles generate and transmit an assumed trajectory that is based on the extension of the previously computed trajectory. Also similar to [6], [7], cost and constraint penalties on the deviation between computed and assumed trajectories are used in the local optimal control problems to ensure stability, and for the first time in this disclosure, string stability. Such penalties act as a "contract" of sorts, between neighbors, that vehicles are willing to self-impose to ensure boundedness and eventually convergence to zero of the deviation between implemented and assumed behaviors, a mechanism that is woven into how neighbors are modeled in [21].

Section II defines the nonlinear subsystem dynamics, and the distributed optimal control problems are presented in Section III. The distributed receding horizon control algorithms are then defined, and the stability and string stability results are given in Section IV. Finally, Section VIII discusses conclusions and extensions, and Section IX introduces exemplary hardware configurations.

II. System Description and Objective

In this section, we define the system dynamics and pose an integrated cost function for multivehicle platoon stabilization. The states of the vehicles are coupled in the cost function, while each vehicle has decoupled dynamics. We make use of the following notation. The symbol $\|Qx\|_p$ will denote the p=1 or ∞ vector norm of the vector $Qx \in R^n$, or $(x'Qx)^{1/2}$ when p=2, with Q as any symmetric and positive definite or semi-definite real matrix.

The objective is to stabilize a platoon of vehicles $i \in \{1, \ldots, N_v\}$, with lead vehicle i=1, and each vehicle j≥2 having predecessor j−1. For each vehicle i, the position and speed are denoted by $(q_i(t), \dot{q}_i(t)) \in R^2$. The lead car will track a constant speed reference trajectory $(q_L(t), \dot{q}_L)$, with $q_L(t) = q_L(0) + t\dot{q}_L$ for $t \geq 0$. The reference trajectory for each following car $j \geq 2$ is $(q_L(t) - (j-1)d_{sep}, \dot{q}_L)$, with $d_{sep}$ equal to the constant desired separation distance between vehicles. With this notation, we can define the error states $$z_i(t) = \begin{bmatrix} q_{i,e}(t) \\ \dot{q}_{i,e}(t) \end{bmatrix} = \begin{bmatrix} q_i(t) - q_L(t) + (i-1)d_{sep} \\ \dot{q}_i(t) - \dot{q}_L \end{bmatrix}, \quad (1)$$

and control input $u_i(t) \in R$. The decoupled second-order, time-invariant nonlinear error dynamics for each vehicle $i \in \{1, \ldots, N_v\}$ are denoted $$\dot{z}_i(t) = f_i(z_i(t), u_i(t)), t \geq 0, \quad (2)$$

In this disclosure, it is assumed there are no model errors or external disturbances. Standard assumptions are now made regarding the system (2).

Assumption II.1: The following holds for all i:
(a) $f_i: R^2 \times R \to R^2$ is twice continuously differentiable, $0 = f_i(0, 0)$, and $f_i$ linearized around $(0, 0)$ is controllable;
(b) the system (2) has a unique, absolutely continuous solution for any initial condition $z_i(0)$ and any piecewise right-continuous control $u:[0,\infty) \to R$.

The stability and string stability control problems are now defined.

Definition 1. Stability control problem: For a step change in $\dot{q}_L$ at time $t=0$, the control objective is to asymptotically stabilize the error state of every car in the platoon to the origin. Observe that a step change in $\dot{q}_L$ at $t=0$ implies that $z_i(0) \neq 0$, $\forall i = 1, \ldots, N_v$.

Definition 2. Leader-Follower string stability control problem: For a step change in $\dot{q}_L$ at time $t=0$, the control objective is to asymptotically stabilize the state of every car in the platoon to the origin, and satisfy the following condition: For every $j = 2, \ldots, N_v$, there exists a constant $\alpha_j \in (0,1)$ such that the closed-loop position error satisfies $$\max_{t \geq 0} |q_{j,e}(t)| \leq \alpha_j \max_{t \geq 0} |q_{1,e}(t)|. \quad (3)$$

A more-stringent condition that will also be examined is predecessor-follower string stability.

Definition 3. Predecessor-Follower string stability control problem: For a step change in $\dot{q}_L$ at time $t=0$, the control objective is to asymptotically stabilize the state of every car in the platoon to the origin, and satisfy the following condition: For every $j = 2, \ldots, N_v$, there exists a constant $\alpha_j \in (0,1)$ such that the closed-loop position error satisfies $$\max_{t \geq 0} |q_{j,e}(t)| \leq \alpha_j \max_{t \geq 0} |q_{(j-1),e}(t)|. \quad (4)$$

By definition 2, leader-follower string stability permits any follower to have a larger closed loop position error than any other car, including it's immediate predecessor, except the lead car. Thus, it is less stringent than the more classical predecessor-follower string stability condition in Definition 3. As defined herein, predecessor-follower string stability implies leader-follower string stability.

III. Distributed Receding Horizon Control

In this section, notations and definitions are introduced for the optimal control problem and the distributed receding horizon control algorithm for each vehicle. In every distributed optimal control problem, the same constant prediction horizon $T \in (0, \infty)$ and constant update period $\delta \in (0, T]$ are used. In practice, the update period $\delta \in (0, T]$ is the sample interval. The common receding horizon update times are denoted $t_k = t_0 + \delta k$, where $t_0 = 0$ and $k \in N = \{0, 1, 2, \ldots\}$.

Here, $z_i(t)$ and $u_i(t)$ are the actual error state and control, respectively, for each vehicle $i \in \{1, \ldots, N_v\}$ at any time $t \geq t_0$. Over any prediction interval $\{t_k, t_k + T\}$, $k \in N$, associated with update time $t_k$, these three trajectories are denoted:

$z_i^P(\tau; t_k)$: the predicted state trajectory,
$z_i^*(\tau; t_k)$: the optimal predicted state trajectory, and
$\hat{z}_i(\tau; t_k)$: the assumed state trajectory, where $\tau \in [t_k, t_k + T]$. The corresponding control trajectories are denoted likewise. That is, $z_i^P(\tau; t_k)$ is the state trajectory variable that parameterizes the optimal control problem, and $z_i^*(\tau; t_k)$ is the optimal solution to that problem. Also, $\hat{z}_i(\tau; t_k)$ is the trajectory communicated to follower $i+1$, and which $i+1$ assumes that $i$ will implement over the update period $[t_k, t_k + T]$. As detailed below, at time $\tau = t_k$, all of these trajectories are equal to the initial condition $z_i(t_k)$. Additionally, a terminal equality constraint is implemented in each optimal control problem, and at time $\tau = t_k + T$, all of these trajectories are equal to zero. The closed-loop system for which stability is to be guaranteed is $$\dot{z}_i^*(t; t_k) = f_i(z_i^*(t; t_k), u_i^*(t; t_k)), t \in [t_k, t_{k+1}], k \in N, i \in \{1, \ldots, N_v\}. \quad (5)$$

The distributed optimal control problems are now defined.

Problem III.1: For each vehicle $i \in \{1, \ldots, N_v\}$ and update time $t_k$, $k \in N$, given $z_i(t_k)$, $\hat{z}_i(\tau; t_k)$, and $\hat{z}_{i-1}(\tau; t_k)$ for all $t \in [t_k, t_{k+1}]$, find $$J_i^*(z_i(t_k), u_i^*(\cdot; t_k)) = \min_{u_i^P(\cdot; t_k)} J_i(z_i^P(\cdot; t_k), u_i^P(\cdot; t_k)),$$

with $$J_i(z_i^P(\cdot; t_k), u_i^P(\cdot; t_k)) = \int_{t_k}^{t_k+T} \left\{ \begin{array}{l} \|Q_i z_i^P(s; t_k)\|_p + \|F_i z_i^P(s; t_k) - \hat{z}_i(s; t_k)\|_p + \\ \|G_i z_i^P(s; t_k) - \hat{z}_{i-1}(s; t_k)\|_p + \|R_i u_i^P(s; t_k)\|_p \end{array} \right\} ds,$$

subject to $$\dot{z}_i^P(\tau; t_k) = f_i(z_i^P(\tau; t_k), u_i^P(\tau; t_k)), t \in [t_k, t_{k+1}], z_i^P(t_k; t_k) = z_i(t_k), z_i^P(t_k + T; t_k) = 0.$$

All weighting matrices are assumed symmetric and satisfy:
$Q_1 > 0$, $F_1 \geq 0$, $G_1 = 0$, and $R_1 > 0$ (for the lead car),
$Q_i \geq 0$, $F_i \geq 0$, $G_i \geq 0$, and $R_i > 0$, for $i = 2, \ldots, N_v$.

Reference is now made to the (optimal) cost terms as the move suppression (MS) term $\|F_i(z_i^* - \hat{z}_i)\|$ and the predecessor relative error (PRE) term $\|G_i(z_i^* - \hat{z}_{i-1})\|$. After substitution, the difference states in these terms have the following form:

$$z_i^* - \hat{z}_i = \begin{bmatrix} q_i^* - \hat{q}_i \\ \dot{q}_i^* - \dot{\hat{q}}_i \end{bmatrix}, z_i^* - \hat{z}_{i-1} = \begin{bmatrix} q_i^* - \hat{q}_{i-1} + d_{sep} \\ \dot{q}_i^* - \dot{\hat{q}}_{i-1} \end{bmatrix}. \quad (6)$$

Remark III.1: If $Q_i = 0$ for any following car $i \geq 2$ the optimal control problem could be rewritten to include only information from the preceding car (see (6)), with no information about the reference $(q_L(t), \dot{q}_L(t))$ required. Removing the requirement that all cars in the platoon have knowledge about the lead car's reference trajectory would have obvious advantages in real applications. To achieve this, the cost function, initial condition and dynamics in an optimal control problem would be rewritten in the inertial states ($q^*_i, \dot{q}^*_i$), instead of the error states.

Next, the terminal constraint could equivalently be defined using the predecessor's trajectories as $q^*_i(t_k+T;t_k)=\hat{q}_{i-1}(t_k+T;t_k)-d_{sep}$ and $\dot{q}^*_i(t_k+T;t_k)=\hat{\dot{q}}_{i-1}(t_k+T;t_k)$, provided that i−1 has already been informed of any changes in desired speed through their predecessor's assumed trajectories. For this reason, a stability analysis is pursued that holds while permitting $Q_i=0$ for any following car i≥2. It should also be noted that the $Q_i$ terms could be re-written using the computed lead-car trajectories, instead of the (perfect) reference trajectories.

The terminal equality constraint $z_i^P(t_k+T;t_k)=0$ facilitates the stability analysis. Instead of a terminal equality constraint, much research has examined receding horizon controller stability while implementing a terminal inequality constraint, in which case $z_i^P(t_k+T;t_k)$ is constrained to arrive in a compact set containing the origin [4], [16]. Principally, the motivation is that such a constraint would be easier to enforce numerically in the optimization solver than an equality constraint. There are efficient modern methods of solving nonlinear optimal control problems with terminal equality constraints [2], [20], so the use of a terminal equality constraint is not viewed as a serious drawback. The control algorithm that all cars implement in parallel during every (common) update period $[t_k;t_{k+1}]$ is now stated.

Algorithm III.1: Distributed receding horizon controller for any vehicle i∈{1, . . . , $N_v$}:

Data: T∈(0,∞), δ(0,T]. Platoon is at equilibrium ($z_i=0$, ∀i) for all time t<0.

Initialization: At some time t'<0−δ, the lead car i=1 broadcasts the intent to change desired speed to a new constant value, starting at time $t_0=0$. All cars receive the new desired speed $\dot{q}_L$. During the initialization update period [−δ,0], each car I solves Problem III.1 setting $F_i=G_i=0$ and using the new desired speed.

Controller: Over any interval $[t_k,t_{k+1})$, k∈N:
1) Apply $u^*_i(\tau;t_k)$, $\tau\in[t_k,t_{k+1})$.
2) Compute predicted state $z_i(t_{k+1})=z^*_i(t_{k+1};t_k)$.
3) Compute $\hat{z}_i(\tau;t_{k+1})$ as $$\hat{z}_i(\tau; t_{k+1}) = \begin{cases} z^*_i(\tau; t_k), & \tau \in [t_{k+1}, t_k + T) \\ 0, & \tau \in [t_k + T, t_{k+1} + T] \end{cases} \quad (7)$$

4) Transmit $\hat{z}_i(\bullet;t_{k+1})$ to follower i+1 and for j≥2 receive $\hat{z}_j(\bullet;t_{k+1})$ from predecessor j=i−1.
5) Solve Problem III.1 for $u^*_i(\bullet;t_{k+1})$.

An assumed control $\hat{u}_i(\tau;t_{k+1})$ is defined likewise and will be used in the analysis sections $$\hat{u}_i(\tau; t_{k+1}) = \begin{cases} u^*_i(\tau; t_k), & \tau \in [t_{k+1}, t_k + T) \\ 0, & \tau \in [t_k + T, t_{k+1} + T] \end{cases} \quad (8)$$

During the initialization update period [−δ,0] each car i solves Problem III.1 setting $F_i=G_i=0$ and using the new desired speed. As such, the assumed trajectories are not needed during the initialization phase. There are several other forms of initialization that could be considered. For example, the lead car could solve Problem III.1 setting $F_i=G_i=0$, then broadcast $z^*_i(\bullet;t_0)$ to all cars in the platoon. Subsequently, all cars i≥2 could solve Problem III.1 removing the move suppression term ($F_i=0$) and redefining the predecessor-relative error term as a lead-relative error term, and set $G_i>0$. This two-stage optimization at initialization (one optimization for the leader, and then all followers optimizing in parallel) would need to terminate and converge before $t_0=0$.

IV. Analysis

A. Stability

We denote the concatenated vectors $z=(z_1, \ldots, z_N)$ and $u=(u_1, \ldots, u_N)$ using comparable notation for the optimal and assumed trajectories. The main result of this subsection is to show that by applying Algorithm III.1, the closed-loop state z(t) converges to the origin asymptotically. At any time $t_k$, k∈N, the sum of the optimal distributed value functions is denoted $$J^*_\Sigma(z(t_k)) = \sum_{i=1}^{N_v} J^*_i(z_i(t_k), u^*_i(\bullet;(t_k))).$$

The following is a standard result from receding horizon control theory.

Lemma IV.1. Suppose Assumption II.1 holds. Then, for any update period δ∈(0,T], Problem III.1 has $z_i^P(\bullet;t_k),u_i^P(\bullet;tk))=(\hat{z}_i(\bullet;t_k),\hat{u}_i(\bullet;t_k))$ as a feasible solution at any update time $t_k$, k∈{1, 2, . . . }.

The assumed control $\hat{u}_i(\bullet;t_k)$ defined in (8) is exactly the feasible control trajectory used in [4] and elsewhere. The remaining analysis is based on Algorithm III.1, and so relies on computing the optimal solution to Problem III.1 at every update. The following lemma gives a bounding result on the decrease in $J^*_\Sigma(\bullet)$ from one update to the next.

Lemma IV.2. Suppose Assumption II.1 holds, and let p=1, 2 or ∞ in the norms of the local cost functions. If the MS and PRE weights satisfy the bounds $$F_i \geq G_{i+1}, i=1, \ldots, N_v-1, \quad (9)$$

that is, if the PRE weight of each car i+1 is upper bounded by the MS weight of its predecessor i, then by application of Algorithm III.1, the function $J^*_\Sigma(\bullet)$ satisfies $$J^*_\Sigma(z(t_k + \delta)) - J^*_\Sigma(z(t_k)) \leq -\int_{t_k}^{t_k+\delta} L(z^*(s; t_k), \hat{z}(s; t_k), u^*(s; t_k))\, ds$$

for all k∈{1, 2, . . . }, where $$L(z^*, \hat{z}, u^*) \triangleq \sum_{i=1}^{N_v} \|Q_i z^*_i\|_p + \|F_i(z^*_i - \hat{z}_i)\|_p + \|G_i(z^*_i - \hat{z}_{i-1})\|_p + \|R_i u^*_i\|_p.$$

Proof: For any k≥1, $$J^*_\Sigma(z(t_k)) = \int_{t_k}^{t_k+T} L(z^*(s; t_k), \hat{z}(s; t_k), u^*(s; t_k))\, ds.$$

Applying the optimal control for some δ∈(o,T] seconds, we are now at time $t_{k+1}=t_k+\delta$, with new state update $z(t_{k+1})$. A feasible (suboptimal) control for Problem III.1 at update time $t_{k+1}$ is $u^p(\bullet;t_{k+1})=\hat{u}(\bullet;t_{k+1})$; therefore, we can bound the optimal cost as $$J^*_\Sigma(z(t_{k+1})) \leq \int_{t_{k+1}}^{t_{k+1}+T} L(\hat{z}(s;t_{k+1}), \hat{z}(s;t_{k+1}), \hat{u}(s;t_{k+1}))ds$$

$$= \int_{t_{k+1}}^{t_k+T} L(z^*(s;t_k), z^*(s;t_k), u^*(s;t_k))ds.$$

The equality holds because of how $\hat{z}(s;t_{k+1})$ is defined by (7) in Algorithm III.1, and $\hat{u}(s;t_{k+1})$ is defined likewise. Subtracting the equations gives $$J^*_\Sigma(z(t_k+\delta)) - J^*_\Sigma(z(t_k)) \leq -\int_{t_k}^{t_{k+1}} L(z^*(s;t_k), \hat{z}(s;t_k), u^*(s;t_k))ds +$$

$$\int_{t_{k+1}}^{t_k+T} L(z^*(s;t_k), z^*(s;t_k), u^*(s;t_k)) - L(z^*(s;t_k), \hat{z}(s;t_k), u^*(s;t_k))ds.$$

Showing that the second integral expression with limits $t_k+1$ to $t_k+T$ is bounded above by 0 gives the stated result. Combining terms from the definition of L we have that the second term's integrand is equal to $$\sum_{i=1}^{N_v} \|G_i(z_i^*(s;t_k)-z_{i-1}^*(s;t_k))\|_p - \qquad (10)$$

$$\|F_i(z_i^*(s;t_k)-\hat{z}_i(s;t_k))\|_p - \|G_i(z_i^*(s;t_k)-\hat{z}_{i-1}(s;t_k))\|_p$$

With the triangle inequality for vector norms $\|G_i(z^*_i(s;t_k)-z^*_{i-1}(s;t_k))\|_p \leq \|G_i(z^*_i(s;t_k)-\hat{z}^*_{i-1}(s;t_k))\|_p + \|G_i(z^*_{i-1}(s;t_k)-\hat{z}^*_{i-1}(s;t_k))\|_p.$ With $G_1=0$, we have (10) is bounded by $$\sum_{i=1}^{N_v-1} \|G_{i+1}(z_i^*(s;t_k)-\hat{z}_i(s;t_k))\|_p - \|F_i(z_i^*(s;t_k)-\hat{z}_i(s;t_k))\|_p$$

and this is bounded above by zero if (9) holds. This completes the proof.

Equation (9) provides an interesting tradeoff between the PRE and MS terms in neighboring local cost functions. Essentially, the sufficient condition for stability suggests that a following car can commit more to the PRE term (i.e., can invest more in the assumed behavior of its predecessor) only if the increased weight is matched or exceeded by the commitment of its predecessor to its own assumed trajectory via the MS term. Another viewpoint: car i sends an assumed trajectory to its follower; with little or no commitment to that trajectory (small $F_i$), the follower i+1 should not rely too heavily on the received trajectory ($G_i+1$ must be as small or smaller than $F_i$) to be consistent with the stability criteria. It is important to emphasize that Lemma IV.2 is distributed with respect to the vehicles in the platoon. Vehicle i only requires knowledge of its immediate predecessor's weight $F_{i-1}$ to restrict its choice of $G_i$.

Typically, the norm terms in the integrated cost function are 2-norms squared. The proof of Lemma IV.2 must be modified for that case, since use of the triangle inequality following (10) results in cross terms that must be compensated for. A proof that achieves this can be done by following the approach in [7]. The first main theorem of the paper is now stated.

Theorem 1. Suppose Assumption II.1 and the conditions of Lemma IV.2 hold. Then, by application of Algorithm III.1, the closed-loop state trajectory enters the compact level set $$\Omega_d = \{z \in \mathbb{R}^{2N_v} | J^*_\Sigma(z) \leq \beta\}$$

in finite time, for any given >0, and remains there for all future time. Additionally, if $\hat{z}(s;t_{k+1})$ is continuous in z at z=0, then the closed-loop state trajectories are asymptotically stabilized to the origin.

Proof: Let $V(z)=J^*_\Sigma(z)$ serve as a Lyapunov certificate. The bound in Lemma IV.2 shows $V(z(t_k))$ decreasing strictly monotonically with update time $t_k$. This can be used to prove finite-time convergence to and positive invariance of $\Omega_\beta$, following arguments established in [4], [7].

The function $V(z)$ satisfies $V(0)=0$ and $V(z)>0$ for $z\neq 0$. With the assumption on continuity of the control at the origin, one can show $V(z)$ is continuous at $z=0$[5]. From these properties, asymptotic stabilization follows using V as the Lyapunov certificate [4].

B. Leader-Follower String Stability

In the analysis here, we examine two different methods for achieving leader-follower string stability. In each method, we redefine the local optimal control problems and algorithm presented above. The first method places conditions on new design parameters, and requires an assumption about the maximum closed-loop position error of the leader. The second method places more restrictive conditions on the same design parameters, and requires a harder optimization problem at initialization, but removes the need for the assumption on the maximum closed-loop position error of the leader. In this section, we use the notation:

$$|q^*_{j,e}(t;t_k)|_\infty = \max_{t \in [t_k, t_k+T]} |q^*_{j,e}(t;t_k)|$$

$$|q^*_{j,e}(t;t_k)|_{\infty,\delta} = \max_{t \in [t_k, t_k+\delta]} |q^*_{j,e}(t;t_k)|.$$

For any car $j=1, \ldots, N_v$, the maximum closed-loop position error satisfies $\max_{t\geq 0}|q_{j,e}(t)|=\max_{l\in\{0,1,2\ldots\}}|q^*_{j,e}(t;t_l)|_{\infty,\delta}$ by definition, and since $|q^*_{j,e}(t;t_l)|_{\infty,\delta} \leq |q^*_{j,e}(t;t_l)|_\infty$ we also have that $\max_{t\geq 0}|q_{j,e}(t)|\leq\max_{l\in\{0,1,2\ldots\}}|q^*_{j,e}(t;t_l)|_\infty$. If the maximum computed error occurred during an update period, then we have equality:

$$\max_{t\geq 0}|q_{j,e}(t)|=\max_{l\in\{0,1,2\ldots\}}|q^*_{j,e}(t;t_l)|_\infty.$$

Assuming this for the lead car facilitates the algorithm and analysis, as shown in Method 1.

1) Method 1: For the method developed, we show that for any $j=1, \ldots, N_v$, there exists an $\alpha_j \in (0,1)$ such that the closed-loop position error satisfies:

$$|q^*_{j,e}(t;t_k)|_\infty \leq \alpha_j \max_{l \in [0,\ldots,k]} |q^*_{1,e}(t;t_l)|_\infty, \forall k = 0, 1, 2, \ldots \qquad (11)$$

Equation (11) is a sufficient condition that ensures (3) with the following assumption:

Assumption IV.1. The maximum computed position error for the lead car occurs during an update period.

As stated, Assumption IV.1 implies $\max_{t\geq 0}|q_{j,e}(t)|=\max_{l\in\{0,1,2\ldots\}}|q^*_{j,e}(t;t_l)|_\infty$. An alternate algorithm that does not require this assumption is presented in the next section on Method 2. However, that algorithm incorporates more constraints to be enforced at initialization.

Algorithm IV.1. Distributed receding horizon controller for any vehicle $i \in \{1, \ldots, N_v\}$:

Data: $T \in (0, \infty)$, $\delta \in (0, T]$. Platoon is at equilibrium ($z_i = 0$, $\forall i$) for all time $t < 0$.

Initialization with update period $[-\delta, 0]$: At some time $t' < 0 - \delta$, the lead car $i=1$ broadcasts the intent to change desired speed to a new constant value, starting at time $t_0 = 0$. All cars receive the new desired speed $\dot{q}_L$. In addition, during the initialization update period $[-\delta, 0]$:

1) Car 1 solves Problem III.1 setting $F_1 = 0$ and using the new desired speed, then broadcasts $q^*_{1,e}(\bullet; t_0)$ to all cars $2, \ldots, N_v$ in the platoon. Next:

2) Each car $i \geq 2$ solves Problem III.1 with the additional constraint:

$$|q_{i,e}^P(t;t_0)|_\infty \leq \beta_i |q^*_{1,e}(t;t_0)|_\infty, \quad (12)$$

setting $\beta_i \in (0,1)$, $F_i = G_i = 0$ and using the new desired speed.

Controller: Over any interval $[t_k, t_{k+1})$, $k \in \mathbb{N}$:
1) Apply $u^*_i(\tau; t_k)$, $\tau \in [t_k, t_{k+1})$.
2) Compute predicted state $z_i(t_{k+1}) = z^*_i(t_{k+1}; t_k)$.
3) Compute $\hat{z}_i(\tau; t_{k+1})$ as defined by (7).
4) Transmit $\hat{z}_i(\bullet; t_{k+1})$ to follower $i+1$ and for $j \geq 2$ receive $\hat{z}_j(\bullet; t_{k+1})$ from predecessor $j = i - 1$. Additionally, all $i \geq 2$ receive $\hat{q}_{1,e}(\bullet; t_{k+1})$ from the lead car.
5) Solve Problem III.1 for $u^*_i(\bullet; t_{k+1})$, with the additional constraint:

$$|q_{i,e}^P(t;t_{k+1}) - \hat{q}_{i,e}(t;t_{k+1})|_\infty \leq \epsilon_{i,k+1} |\hat{q}_{1,e}(t;t_{k+1})|_\infty, \quad (13)$$

setting the update-dependent parameter $\epsilon_{i,k+1} > 0$.

Theorem 2. Suppose Assumption II.1 holds, the conditions of Lemma IV.2 holds, and that the application of Algorithm IV.1 gives a feasible solution $(z^*_i(\bullet; t_0), u^*_i(\bullet; t_0))$ at initialization for every $i = 1, \ldots, N_v$. Then, by application of Algorithm IV.1:

1) The assumed trajectories $(z_i^P(\bullet; t_k), u_i^P(\bullet; t_k)) = (\hat{z}_i(\bullet; t_k), \hat{u}_i(\bullet; t_k))$ are a feasible solution at every subsequent update $k \geq 1$, and for every $i = 1, \ldots, N_v$;

2) The stability properties of Algorithm III.1 via Theorem 1 are preserved.

3) The closed-loop position errors satisfy (11) if the following parametric condition holds:

$$\beta_i + \sum_{k=1}^{\infty} \epsilon_{i,k}(1 + \epsilon_{1,k}) < 1, \; \forall i = 2, \ldots, N_v. \quad (14)$$

Proof: Part 1 follows from Lemma IV.1 and that the assumed trajectories trivially satisfy (13) for all $i = 1, \ldots, N_v$. For part 2, the logic in Lemma IV.2 and Theorem 1 still applies since the cost function remains unchanged for all local optimal control problems. We now demonstrate part 3. From (12) at initialization (k=0):

$$|q^*_{i,e}(t;t_0)|_\infty \leq \beta_i |q^*_{1,e}(t;t_0)|_\infty \quad (15)$$

From the triangle inequality and (13) and using $|q^*_{i,e}(t;t_{k-1})|_\infty \geq |\hat{q}_{i,e}(t;t_k)|_\infty$, for any $i = 1, \ldots, N_v$ and any $k \geq 1$, we have $$|q^*_{i,e}(t;t_k)|_\infty \leq |q^*_{i,e}(t;t_k) - \hat{q}_{i,e}(t;t_k)|_\infty + |\hat{q}_{i,e}(t;t_k)|_\infty \leq \epsilon_{i,k}|\hat{q}_{1,e}(t;t_k)|_\infty + |q^*_{i,e}(t;t_{k-1})|_\infty. \quad (16)$$

From the triangle inequality and (13) for lead car $i=1$, $$|\hat{q}_{1,e}(t;t_k)|_\infty \leq \epsilon_{1,k}|q^*_{1,e}(t;t_{k-1})|_\infty + |q^*_{1,e}(t;t_k)|_\infty.$$

Combining this with (16) gives $$|q^*_{i,e}(t;t_k)|_\infty \leq \epsilon_{i,k}(1+\epsilon_{1,k}) \max_{l=k-1,k} |q^*_{1,e}(t;t_l)|_\infty + |q^*_{i,e}(t;t_{k-1})|_\infty. \quad (17)$$

With (15), equation (17) for k=1 can be expressed as $$|q^*_{i,e}(t;t_1)|_\infty \leq (\epsilon_{i,1}(1+\epsilon_{1,1}) + \beta_i) \max_{l=0,1} |q^*_{1,e}(t;t_l)|_\infty. \quad (18)$$

With (18), equation (17) for k=2 can be expressed as $$|q^*_{i,e}(t;t_2)|_\infty \leq (\epsilon_{i,1}(1+\epsilon_{1,1}) + \epsilon_{i,2}(1+\epsilon_{1,2}) + \beta_i) \max_{l=0,1,2} |q^*_{1,e}(t;t_l)|_\infty. \quad (19)$$

Carrying this out recursively, we have $$|q^*_{i,e}(t;t_n)|_\infty \leq \left(\beta_i + \sum_{k=1}^{n} \epsilon_{i,k}(1+\epsilon_{1,k})\right) \max_{l=0,\ldots,n} |q^*_{1,e}(t;t_l)|_\infty. \quad (20)$$

Thus, the closed-loop position errors satisfy (11) if the parametric condition (14) holds.

Existence of parameter values that satisfy (14) can be established by examining convergent geometric series. For simplicity, consider setting $\beta_i = \beta \in (0,1)$, and $\epsilon_{i,k} = \epsilon_{1,k} = \epsilon^k$, with $\epsilon \in (0,1)$, for all $i = 1, \ldots, N_v$. Then, $$\beta_i + \sum_{k=1}^{\infty} \epsilon_{i,k}(1+\epsilon_{1,k}) = \beta + \frac{1}{1-\epsilon} + \frac{1}{1-\epsilon^2} - 2$$

using the familiar series relation $$\sum_{n=0}^{\infty} x^n = 1 + x + x^2 + \ldots = \frac{1}{1-x},$$

provided $|x| < 1$. Since the sums on $\epsilon$ start with an index of k=1, we removed the $x^0$ term, and applied this relation to $x = \epsilon$ and $x = \epsilon^2$ separately in the expression above. Thus, we must choose $(\beta, \epsilon)$ to satisfy $$\beta + \frac{1}{1-\epsilon} + \frac{1}{1-\epsilon^2} = \beta + \frac{2+\epsilon}{1-\epsilon^2} < 3,$$

with the added conditions that $\beta, \epsilon \in (0,1)$. Example values that satisfy this include $(\beta, \epsilon) = (0.7, 0.2), (0.87, 0.1), (0.45, 0.3)$. As stated, Assumption IV.1 is required in Method 1 for these parametric conditions to result in leader-follower string stability.

2) Method 2: For the method developed here, we show that for any j=2, ..., $N_v$, there exists an $\alpha_j \in (0,1)$ such that the closed-loop position error satisfies $$|q^*_{j,e}(t; t_k)|_{\infty,\delta} \leq \alpha_j \max_{l \in [0,...,k]} |q^*_{1,e}(t; t_l)|_{\infty,\delta} \quad \forall k = 0, 1, 2, ... \quad (21)$$

Equation (21) is a sufficient condition that ensures (3), and removes the need for Assumption IV.1.

Algorithm IV.2. Distributed receding horizon controller for any vehicle $i \in \{1, ..., N_v\}$:

Data: $T \in (0,\infty)$, $\delta \in (0, T]$. Platoon is at equilibrium ($z_i=0$, $\forall i$) for all time t<0.

Initialization with update period $[-\delta, 0]$: At some time $t'<0-\delta$, the lead car i=1 broadcasts the intent to change desired speed to a new constant value, starting at time $t_0=0$. All cars receive the new desired speed $\dot{q}_L$. In addition, during the initialization update period $[-\delta, 0]$:

1) Car 1 solves Problem III.1 setting $F_1=0$ and using the new desired speed, then broadcasts $q^*_{1,e}(\cdot; t_0)$ to all cars 2, ..., $N_v$ in the platoon. Next:

2) Each car i≥2 solves Problem III.1 with the additional constraint:

$$|q_{i,e}^P(t;t_0)| \leq \beta_i |q^*_{1,e}(t;t_0)|, \quad \forall t \in [t_0, t_0+T] \quad (22)$$

setting $\beta_i \in (0,1)$, $F_i = G_i = 0$ and using the new desired speed.

Controller: Over any interval $[t_k, t_{k+1})$, $k \in N$:
1) Apply $u^*_i(\tau; t_k)$, $\tau \in [t_k, t_{k+1}]$.
2) Compute predicted state $z_i(t_{k+1}) = z^*_i(t_{k+1}; t_k)$.
3) Compute $\hat{z}_i(\tau; t_{k+1})$ as defined by (7).
4) Transmit $\hat{z}_i(\cdot; t_{k+1})$ to follower i+1 and for j≥2 receive $\hat{z}_j(\cdot; t_{k+1})$ from predecessor j=i-1. Additionally, all i≥2 receive $\hat{q}_{1,e}(\cdot; t_{k+1})$ from the lead car.
5) Solve Problem III.1 for $u^*_i(\cdot; t_{k+1})$, with an additional constraint. For car i=1:

$$|q_{i,e}^P(t;t_{k+1}) - \hat{q}_{i,e}(t;t_{k+1})|_\infty \leq \varepsilon_{i,k+1} |q_{1,e}^P(t;t_{k+1})|_{\infty,\delta}, \quad (23)$$

and for can i≥2:

$$|q_{i,e}^P(t;t_{k+1}) - \hat{q}_{i,e}(t;t_{k+1})|_\infty \leq \varepsilon_{i,k+1} |\hat{q}_{1,e}(t;t_{k+1})|_{\infty,\delta}, \quad (24)$$

setting the update-dependent parameter $\varepsilon_{i,k+1} > 0$.

Observe that (22) is a harder constraint to satisfy than (12). Constraints (23) and (24) are generally harder to satisfy than (13) also.

Theorem 3. Suppose Assumption II.1, the conditions of Lemma IV.2 hold, and that in the application of Algorithm IV.2 a feasible solution $(z^*_i(\cdot; t_0), u^*_i(\cdot; t_0))$ is found at initialization for every i=1, ..., $N_v$. Then, by application of Algorithm IV.2:

1) The assumed trajectories $(z_i^P(\cdot; t_k), u_i^P(\cdot; t_k)) = (\hat{z}_i(\cdot; t_k), \hat{u}_i(\cdot; t_k))$ are a feasible solution at every subsequent update k≥1, and for every i=1, ..., $N_v$;

2) The stability properties of Algorithm III.1 via Theorem 1 are preserved.

3) The closed-loop position errors satisfy (21) if the following parametric condition holds:

$$\beta_i + \beta_i \sum_{k=1}^{\infty} \varepsilon_{1,k} + \sum_{k=1}^{\infty} \varepsilon_{i,k}(1+\varepsilon_{1,k}) < 1. \forall i = 2, ..., N_v. \quad (25)$$

Proof: Parts 1 and 2 follow Theorem 2. From (22) at initialization, for the k=0 case we have $$|q^*_{i,e}(t;t_0)|_{\infty,\delta} \leq \beta_i |q^*_{1,e}(t;t_0)|_{\infty,\delta}. \quad (26)$$

Consider the case k=1 next. From the triangle inequality and (24), for any i=2, ..., $N_v$, we have on the interval $[t_1, t_1+T]$ $$|q^*_{i,e}(t; t_1)| \leq |q^*_{i,e}(t; t_1) - \hat{q}_{i,e}(t; t_1)| + |\hat{q}_{i,e}(t; t_1)| \leq \quad (27)$$
$$\varepsilon_{i,1} |\hat{q}_{1,e}(t; t_1)|_{\infty,\delta} + |\hat{q}_{i,e}(t; t_1)|$$

From the triangle inequality and (23) for lead car i=1, $$|\hat{q}_{1,e}(t;t_1)| \leq \varepsilon_{1,1} |\hat{q}^*_{1,e}(t;t_1)|_{\infty,\delta} + |\hat{q}^*_{1,e}(t;t_1)|. \quad (28)$$

for all $t \in [t_1, t_1+T]$. This implies $|\hat{q}_{1,e}(t;t_1)|_{\infty,\delta} \leq (1+\varepsilon_{1,1})|q^*_{1,e}(t;t_1)|_{\infty,\delta}$. From (22) at initialization, $|\hat{q}_{i,e}(t;t_1)| \leq \beta_i |\hat{q}_{1,e}(t;t_1)|$ for all $t \in [t_1, t_1+T]$. Combining these two last bounds with (27) gives $$|q^*_{i,e}(t;t_1)| \leq (\varepsilon_{i,1}(1+\varepsilon_{1,1}) + \beta_i \varepsilon_{1,1})|q^*_{1,e}(t;t_1)|_{\infty,\delta} + \beta_i |q^*_{1,e}(t;t_1)| \quad (29)$$

for all $t \in [t_1, t_1+T]$. This inequality results in a bound for the k=1 case as $$|q^*_{i,e}(t;t_1)|_{\infty,\delta} \leq (\beta_i(\varepsilon_{i,1}(1+\varepsilon_{1,1}) + \beta_i \varepsilon_{1,1})|q^*_{1,e}(t;t_1)|_{\infty,\delta}. \quad (30)$$

The form of (29) over the entire interval $[t_1, t_1+T]$ is required next, in addressing the k=2 case. Following the initial steps for (27) and (28) above, for any i=2, ..., $N_v$, we have on the interval $[t_1, t_1+T]$ $$|q^*_{i,e}(t;t_2)| \leq \varepsilon_{i,2}(1+\varepsilon_{1,2})|q^*_{1,e}(t;t_2)|_{\infty,\delta} + |\hat{q}_{i,e}(t;t_2)| \quad (31)$$

From (29), the triangle inequality, and (23), $$|\hat{q}_{i,e}(t; t_2)| \leq (\varepsilon_{i,1}(1+\varepsilon_{1,1}) + \beta_i \varepsilon_{1,1})|q^*_{1,e}(t; t_1)|_{\infty,\delta} + \beta_i |\hat{q}_{1,e}(t; t_2)| \leq$$
$$(\varepsilon_{i,1}(1+\varepsilon_{1,1}) + \beta_i \varepsilon_{1,1})|q^*_{1,e}(t; t_1)|_{\infty,\delta} + \beta_i \varepsilon_{1,2}|q^*_{1,e}(t; t_2)|_{\infty,\delta} + \beta_i |q^*_{1,e}(t; t_2)|$$

for all $t \in [t_2, t_2+T]$. Combining this bound with (31) gives $$|q^*_{i,e}(t; t_2)| \leq \quad (32)$$
$$(\beta_i(\varepsilon_{1,1} + \varepsilon_{1,2}) + \varepsilon_{i,1}(1+\varepsilon_{1,1}) + \varepsilon_{i,2}(1+\varepsilon_{1,2})) \max_{l=1,2}|q^*_{1,e}(t:t_l)|_{\infty,\delta} +$$
$$\beta_i |q^*_{1,e}(t:t_2)|$$

for all $t \in [t_2, t_2+T]$. This inequality results in a bound for the k=2 case as $$|q^*_{i,e}(t:t_2)|_{\infty,\delta} \leq \quad (33)$$
$$(\beta_i + \beta_i(\varepsilon_{1,1} + \varepsilon_{1,2}) + \varepsilon_{i,1}(1+\varepsilon_{1,1}) + \varepsilon_{i,2}(1+\varepsilon_{1,2})) \max_{l=1,2}|q^*_{1,e}(t:t_l)|_{\infty,\delta}.$$

Carrying this out recursively, we have the k=n case:

$$|q^*_{i,e}(t;t_n)|_{\infty,\delta} \leq \left(\beta_i + \beta_i \sum_{j=1}^{n} \varepsilon_{1,j} + \sum_{j=1}^{n} \varepsilon_{i,j}(1+\varepsilon_{1,j})\right) \max_{l=0,...,n}|q^*_{1,e}(t;t_l)|_{\infty,\delta}.$$

Thus, the closed-loop position errors satisfy (21) if the parametric condition (25) holds.

As before, existence of parameter values that satisfy (25) can be established by examining convergent geometric series. Setting $\beta_i = \beta \in (0,1)$, and $\varepsilon_{i,k} = \varepsilon_{i,k} = \varepsilon^k$, with $\varepsilon \in (0,1)$, for all i=1, ..., $N_v$. Then, $$\beta_i + \beta_i \sum_{k=1}^{\infty} \varepsilon_{1,k} + \sum_{k=1}^{\infty} \varepsilon_{1,k}(1+\varepsilon_{1,k}) = \beta + \beta \left[\frac{1}{1-\varepsilon} - 1\right] +$$

$$\frac{1}{1-\varepsilon} + \frac{1}{1-\varepsilon^2} - 2$$

$$= \frac{\beta+1}{1-\varepsilon} + \frac{1}{1-\varepsilon^2} - 2$$

We must therefore choose $(\beta,\epsilon)$ to satisfy $$\frac{\beta+1}{1-\varepsilon} + \frac{1}{1-\varepsilon^2} < 3,$$

with the added conditions that $\beta,\epsilon \in (0,1)$. An example set of values that satisfy this include $(\beta,\epsilon)=(0.55, 0.2)$, which is a reduced value in compared to the values $(0.7, 0.2)$ that satisfied (14). Although the parametric conditions on $\{\beta_i,\epsilon_{i,j}\}$ are tighter, and the constraints in the modified optimal control problems are (moderately) more restrictive, Assumption IV.1 is no longer required for leader-follower string stability.

C. Predecessor-Follower String Stability

In the analysis here, we redefine the local optimal control problems and algorithm in a way that is comparable to Method 2 above. Our goal is to show that for any $j=2, \ldots, N_v$ there exists an $\alpha_j \in (0,1)$ such that the closed-loop position error satisfies $$|q^*_{j,e}(t; t_k)|_{\infty,\delta} \leq \alpha_j \max_{l \in \{0,\ldots,k\}} |q^*_{j-1,e}(t; t_l)|_{\infty,\delta} \quad \forall k = 0, 1, 2, \ldots \quad (34)$$

Equation (34) is a sufficient condition that ensures (4). In the algorithm below, cars $i \geq 3$ need to communicate with the lead car $i=1$ only at initialization. This is an advantage over string-stable controllers that require continuous position, speed or acceleration information from the lead and preceding cars.

Algorithm IV.3. Distributed receding horizon controller for any vehicle $i \in \{1, \ldots, N_v\}$:

Data: $T \in (0,\infty)$, $\delta \in (0,T]$. Platoon is at equilibrium ($z_i=0$, $\forall i$) for all time $t<0$.

Initialization with update period $[-\delta,0]$: At some time $t'<0-\delta$, the lead car $i=1$ broadcasts the intent to change desired speed to a new constant value, starting at time $t_0=0$. All cars receive the new desired speed $\dot{q}_L$. In addition, during the initialization update period $[-\delta,0]$:

1) Car 1 solves Problem III.1 setting $F_1=0$ and using the new desired speed, then broadcasts $q^*_{1,e}(\bullet;t_0)$ to all cars $2, \ldots, N_v$ in the platoon. Next:

2) Each car $i \geq 2$ solves Problem III.1 with the additional constraint:

$$(1-\xi_i)\gamma_i |q^*_{1,e}(t;t_0)| \leq |q_{i,e}^P(t;t_0)| \leq (1+\xi_i)\gamma_i |q^*_{1,e}(t;t_0)|. \quad (35)$$

for all $t \in [t_0,t_0+T]$, setting $\gamma_i,\xi_i \in (0,1)$, $F_i=G_i=0$ and using the new desired speed.

Controller: Over any interval $[t_k;t_{k+1}]$, $k \in N$:

1) Apply $u^*_i(\tau;t_k)$, $\tau \in [t_k,t_{k+1}]$.

2) Compute predicted state $z_i(t_{k+1})=\hat{z}^*_i(t_{k+1};t_k)$.

3) Compute $\hat{z}_i(\tau;t_{k+1})$ as defined by (7).

4) Transmit $\hat{z}_i(\bullet;t_{k+1})$ to follower $i+1$ and for $j \geq 2$ receive $\hat{z}_j(\bullet;t_{k+1})$ from predecessor $j=i-1$.

5) Solve Problem III.1 for $u^*_i(\bullet;t_{k+1})$, with an additional constraint. For car $i=1$ the added constraint is (23) as before. For car $i=2, \ldots, N_v-1$:

$$|q_{i,e}^P(t;t_{k+1}) - \hat{q}_{i,e}(t;t_{k+1})|_\infty \leq \epsilon_{i,k+1} \min\{|\hat{q}_{i-1,e}(t;t_{k+1})|_{\infty,\delta}, |q_{i,e}^P(t;t_{k+1})|_{\infty,\delta}\}. \quad (36)$$

setting the update-dependent and location-within-platoon-dependent parameter $\epsilon_{i,k+1}>0$. For car $i=N_v$, the constraint is (36) but setting the right hand side to $\epsilon_{N_v,k+1}|\hat{q}_{N_v-1,e}(t;t_{k+1})|_{\infty,\delta}$.

Before establishing string stability, we analyze the initialization portion of our algorithm. By design, the form of (35) is a distributed way to construct a trajectory that is initially predecessor-follower string stable. We show this in the following lemmas. The first lemma shows how the predecessor-follower error gain $\beta_i$ for each $i=2, \ldots, N_v$ is defined by a subset of the design parameters $\{\xi_i,\gamma_i\}_{i=2,\ldots,N_v}$.

Lemma IV.3. By the distributed initialization defined by (35) in Algorithm IV.3, for all $i=2, \ldots, N_v$, the initial trajectories satisfy $$|q^*_{i,e}(t; t_0)| \leq \beta_i |q^*_{i-1,e}(t; t_0)|, \forall t \in [t_0, t_0 + T], \quad (37)$$

with $$\beta_2 = (1+\xi_2)\gamma_2, \quad \beta_i = \frac{1+\xi_i}{1-\xi_{i-1}} \frac{\gamma_i}{\gamma_{i-1}}, i = 3, \ldots, N_v.$$

Proof: From (35), we have lower and upper bounds for $i$ and $i-1$ as $$(1-\xi_i)\gamma_i |q^*_{1,e}(t;t_0)| \leq |q^*_{i,e}(t;t_0)| \leq (1+\xi_i)\gamma_i |q^*_{1,e}(t;t_0)|,$$

$$(1-\xi_{i-1})\gamma_{i-1} |q^*_{1,e}(t;t_0)| \leq |q^*_{i-1,e}(t;t_0)| \leq (1+\xi_{i-1})\gamma_{i-1} |q^*_{1,e}(t;t_0)|,$$

for all $\tau \in [t_0,t_0+T]$. Using the upper bound on $q^*_{i,e}(t;t_0)|$ and lower-bound on $|q^*_{i-1,e}(t;t_0)|$, (37) follows.

Next, one must choose a parameter set $\{\xi_i,\gamma_i\}_{i=2,\ldots,N_v}$ such that $\beta_i$ defined in (37) satisfies $\beta_i \in (0,1)$. In one approach, each car $i$ could choose a value for $\beta_i \in (0,1)$, then given values from its predecessor $\xi_{i-1},\gamma_{i-1}$, chooses $\xi_i,\gamma_i$ using $(1+\xi_i)\gamma_i=\beta_i(1-\xi_{i-1})\gamma_{i-1}$. For car 2, this simplifies to $(1+\xi_2)\gamma_2=\beta_2$. Alternatively, the following lemma defines a parameter set for the case $\beta_i=p \in (0,1)$ for all $i=2, \ldots, N_v$, which may be desirable in some platooning situations.

Lemma IV.4. Let $\epsilon$, $p \in (0,1)$. Then, a parameter set $\{\xi_i,\gamma_i\}_{i=2,\ldots,N_v}$ that satisfies $\beta_i=p=(0,1)$, for all $i=2,\ldots,N_v$ is given by $$\xi_i = \epsilon^{i-1}, \quad \gamma_i = \frac{\rho^{i-1}}{1+\epsilon^{i-1}} \prod_{j=1}^{i-2} \frac{1-\epsilon^j}{1+\epsilon^j}, i = 2, \ldots, N_v. \quad (38)$$

Proof: Substitution from (38) into the definition for each $\beta_i$ shows that $\beta_i=p$. In particular, observe that $\gamma_2=p/(1+\epsilon)$ and $\gamma_{i+1}=\gamma_i p(1-\epsilon^{i-1})/(1+\epsilon^i)$, for $i \geq 2$.

Existence of $\{\xi_i,\gamma_i\}_{i=2,\ldots,N_v}$ values for large N is an issue to consider. For the constructed set of parameters in Lemma IV.4, $\xi_n$ and $\gamma_n$ get smaller as n increases, which means the position errors down the string must be closer to zero than their predecessors. The initialization constraint (35) used to generate initially string-stable trajectories can be re-written equivalently as $$||q_{i,e}^P(t;t_0)| - \gamma_i |q^*_{1,e}(t;t_0)|| \leq \xi_i \gamma_i |q^*_{1,e}(t;t_0)|, \forall t \in [t_0,t_0+T] \quad (39)$$

The combined parameter $\xi_n \gamma_n$ acts as a gain in (39) that affects the allowable deviation of $q_{i,e}^P(t;t_0)$ from $\gamma_i q^*_{1,e}(t;t_0)$ for all $t\in[t_0,t_0+T]$. Using equation (38), values for $\xi_n$, $\gamma_n$ and combined parameter $\xi_n\gamma_n$ versus the vehicle number n is shown in FIG. 1 for up to a platoon size of $N_v=10$ vehicles, setting $p=0.99$ and $\epsilon=0.6$. Practically, the parameter values and implemented constraints only make sense for finite $N_v$. For $N_v\to\infty$, $\xi_n\to 0$ exponentially in $n=N_v$. The trend for $\gamma_n$ can be examined, first by rewriting it as $$\gamma_{n+1} = \frac{\rho^n}{1-\epsilon^n} \prod_{l=1}^{n-1} \frac{1-\left(\frac{1}{\epsilon}\right)^{-l}}{1+\left(\frac{1}{\epsilon}\right)^{-l}}.$$

In the limit of large $N_v$, $$\prod_{k=1}^{\infty} \frac{1-\left(\frac{1}{\epsilon}\right)^{-k}}{1+\left(\frac{1}{\epsilon}\right)^{-k}} = 1 + 2\sum_{k=1}^{\infty} (-1)^k \epsilon^{k^2} =: \theta_4(0,\epsilon). \quad (40)$$

where $\theta_4$ is the Jacobi theta function [24]. Up to any finite $N_v$, we can observe the convergent behavior of $\gamma_n$ using the first several terms in the summation in (40) (summing up to $N_v$, for example) and multiplying it by $$\frac{\rho^{N_v}}{1-\epsilon^{N_v}}.$$

We do this to compute $\gamma_{10}$ and $\gamma_{100}$ shown in FIG. 1. Observe from the figure that $\xi_n\gamma_n$, the gain parameter in the constraint (39), decreases rather dramatically, forcing $q_{n,e}^P(t;t_0)\to\gamma_n q^*_{1,e}(t;t_0)$. In this analysis, the parametric conditions for initialization were derived to ensure $\beta_i=p\in(0,1)$, for all $i=2,\ldots,N_v$; however, an alternative set that permits $\beta_i$ to be smaller as i increases, for example, could alleviate the rate of decrease of $\xi_n\gamma_n$ with n.

Accepting the limitations of our initialization method, we now present the final result, and demonstrate that Algorithm IV.3 ensures predecessor-follower string stability. For this purpose, constraint (36) essentially combines (23) and (24), as each vehicle $i=2,\ldots,N_v-1$ acts as a predecessor (local leader) and a follower. Since $i=N_v$ is strictly a follower, (36) does not require the $\min\{\bullet\}$ on the right hand side.

Theorem 4. Suppose Assumption II.1, the conditions of Lemma IV.2 hold, and that in the application of Algorithm IV.3 a feasible solution $(z^*_i(\bullet;t_0),u^*_i(\bullet;t_0))$ is found at initialization for every $i=1,\ldots,N_v$. Then, by application of Algorithm IV.3:

1) The assumed trajectories $(z_i^P(\bullet;t_k),u_i^P(\bullet;t_k))=(\hat{z}_i(\bullet;t_k),\hat{u}_i(\bullet;t_k))$ are a feasible solution at every subsequent update $k\geq 1$ and for every $i=1,\ldots,N_v$;
2) The stability properties of Algorithm III.1 via Theorem 1 are preserved.
3) The closed-loop position errors satisfy (34) if the following parametric condition holds:

$$\beta_i + \beta_i \sum_{k=1}^{\infty} \varepsilon_{i-1,k} + \sum_{k=1}^{\infty} \varepsilon_{i,k}(1+\varepsilon_{i-1,k}) < 1. \forall i=2,\ldots,N_v. \quad (41)$$

Proof: Parts 1 and 2 follow from the proof of Theorem 2. It remains to prove part 3. From initialization and Lemma IV.3, for $i=2,\ldots,N_v$ and the $k=0$ case we have $$|q^*_{i,e}(t;t_0)|_{\infty,\delta} \leq \beta_i |q^*_{i-1,e}(t;t_0)|_{\infty,\delta}. \quad (42)$$

Consider the case $k=1$ next. From the triangle inequality, and (36) for any $i=2,\ldots,N_v$, we have on the interval $[t_1,t_1+T]$ $$|q^*_{i,e}(t;t_1)| \leq |q^*_{i,e}(t;t_1) - \hat{q}_{i,e}(t;t_1)| + |\hat{q}_{i,e}(t;t_1)| \leq \quad (43)$$
$$\varepsilon_{i,1}|\hat{q}_{i-1,e}(t;t_1)|_{\infty,\delta} + |\hat{q}_{i,e}(t;t_1)|$$

From the triangle inequality and (23) for lead car and (36) for all predecessor cars, for any $i-1=1,\ldots,N_v-1$.

$$|\hat{q}_{i-1,e}(t;t_1)| \leq \varepsilon_{i-1,1}|\hat{q}^*_{i-1,e}(t;t_1)|_{\infty,\delta} + |q^*_{i-1,e}(t;t_1)|. \quad (44)$$

for all $t\in[t_1,t_1+T]$. This implies $|\hat{q}_{i-1,e}(t;t_1)|_{\infty,\delta} \leq (1+\varepsilon_{i-1,1})|q^*_{i-1,e}(t;t_1)|_{\infty,\delta}$. From Lemma IV.3, $|\hat{q}_{i,e}(t;t_1)| \leq \beta_i|\hat{q}_{i-1,e}(t;t_1)|$ for all $t\in[t_1,t_1+T]$. Combining these two last bounds with (43) gives $$|q^*_{i,e}(t;t_1)| \leq (\varepsilon_{i,1}(1+\varepsilon_{i-1,1})+\beta_i\varepsilon_{i-1,1})|q^*_{i-1,e}(t;t_1)|_{\infty,\delta} + \beta_i|q^*_{i-1,e}(t;t_1)| \quad (45)$$

for all $t\in[t_1,t_1+T]$. This inequality results in a bound for the $k=1$ case as $$|q^*_{i,e}(t;t_1)|_{\infty,\delta} \leq (\beta_i + \varepsilon_{i,1}(1+\varepsilon_{i-1,1})+\beta_i\varepsilon_{i-1,1})|q^*_{i-1,e}(t;t_1)|_{\infty,\delta}. \quad (46)$$

Following the steps for equations (43) and (44) above, for any $i=2,\ldots,N_v$, we have on the interval $[t_2,t_2+T]$ $$|q^*_{i,e}(t;t_2)| \leq \varepsilon_{i,2}(1+\varepsilon_{i-1,2})|q^*_{i-1,e}(t;t_2)|_{\infty,\delta} + |\hat{q}_{i,e}(t;t_2)| \quad (47)$$

From (45), (23) and (36), $$|\hat{q}_{i,e}(t;t_2)| \leq (\varepsilon_{i,1}(1+\varepsilon_{i-1,1})+\beta_i\varepsilon_{i-1,1})|q^*_{i-1,e}(t;t_1)|_{\infty,\delta} + \beta_i|\hat{q}_{i-1,e}(t;t_2)| \leq$$
$$(\varepsilon_{i,1}(1+\varepsilon_{i-1,1})+\beta_i\varepsilon_{i-1,1})|q^*_{i-1,e}(t;t_1)|_{\infty,\delta} +$$
$$\beta_i\varepsilon_{i-1,2}|q^*_{i-1,e}(t;t_2)|_{\infty,\delta} + \beta_i|q^*_{i-1,e}(t;t_2)|$$

for all $t\in[t_2,t_2+T]$. Combining this bound with (47) gives $$|q^*_{i,e}(t;t_2)| \leq$$
$$(\beta_i(\varepsilon_{i-1,1}+\varepsilon_{i-1,2})+\varepsilon_{i,1}(1+\varepsilon_{i-1,1})+\varepsilon_{i,2}(1+\varepsilon_{i-1,2}))\max_{l=1,2}|q^*_{i-1,e}(t;t_l)|_{\infty,\delta} +$$
$$\beta_i|q^*_{i-1,e}(t;t_2)|$$

for all $t\in[t_2,t_2+T]$. This inequality results in a bound for the $k=2$ case as $$|q^*_{i,e}(t;t_2)|_{\infty,\delta} \leq \quad (48)$$
$$(\beta_i + \beta_i(\varepsilon_{i-1,1}+\varepsilon_{i-1,2})+\varepsilon_{i,1}(1+\varepsilon_{i-1,1})+\varepsilon_{i,2}(1+\varepsilon_{i-1,2}))$$
$$\max_{l=1,2}|q^*_{i-1,e}(t;t_l)|_{\infty,\delta}.$$

Carrying this out recursively, we have the k=n case:

$$|q^*_{i,e}(t;t_n)|_{\infty,\delta} \le$$

$$\left(\beta_i + \beta_i \sum_{k=1}^{n} \varepsilon_{i-1,k} + \sum_{k=1}^{n} \varepsilon_{i,k}(1+\varepsilon_{i-1,k})\right) \max_{l=0,\ldots,n} |q^*_{i-1,e}(t;t_l)|_{\infty,\delta}.$$

Thus, the closed-loop position errors satisfy (34) if the parametric condition (41) holds.

Existence of parameter values that satisfy (41) when all vehicles share identical $\beta_i = \beta \in (0,1)$, and $\varepsilon_{i,k} = \varepsilon^k$, with $\varepsilon \in (0,1)$, was addressed following the proof of Theorem 3. Recall that the choice of parameters $\{\xi_i,\gamma_i\}_{i=2,\ldots,N_v}$ affects the value $\beta_i$ for from the initialization phase, as defined in (37). The result in Lemma IV.4 applies to the case when all vehicles share identical $\beta_i = \beta \in (0,1)$, and so connects with the analysis following the proof of Theorem 3.

For Predecessor-Follower string stability, we now analyze the case when each vehicle chooses its own values for $\{\beta_i,\varepsilon_i\}$. As stated following Lemma IV.4, an independent choice by vehicle i for $\beta_i$ requires values $\{\xi_{i-1},\gamma_{i-1}\}$ from its predecessor, and selection of $\{\xi_i,\gamma_i\}$ using $(1+\xi_i)\gamma_i = \beta_i(1+\xi_{i-1})\gamma_{i-1}$. In what follows, we further simplify the choice of parameters by setting $\xi_i = \varepsilon_i$, and so $\{\beta_i,\varepsilon_i\}$ are the only variables chosen by vehicle i. These two variables specify the tradeoff made by vehicle i between the attenuation of its preceding vehicle's positioning error and its own move suppression. Now, setting $\varepsilon_{i,k} = \varepsilon_i^k$ in (41) gives $$\beta_i + \beta_i \sum_{k=1}^{\infty} \varepsilon_{i-1,k} + \sum_{k=1}^{\infty} \varepsilon_{i,k}(1+\varepsilon_{i-1,k}) =$$

$$\beta_i + \beta_i \left[\frac{1}{1-\varepsilon_{i-1}} - 1\right] + \frac{1}{1-\varepsilon_i} + \frac{1}{1-\varepsilon_{i-1}\varepsilon_i} - 2 =$$

$$\frac{\beta_i}{1-\varepsilon_{i-1}} + \frac{1}{1-\varepsilon_i} + \frac{1}{1-\varepsilon_{i-1}\varepsilon_i} - 2$$

Therefore, given $\varepsilon_{i-1}$ from its predecessor, each vehicle chooses $\{\beta_i,\varepsilon_i\} \in (0,1)^2$ to satisfy $$\frac{\beta_i}{1-\varepsilon_{i-1}} + \frac{1}{1-\varepsilon_i} + \frac{1}{1-\varepsilon_{i-1}\varepsilon_i} < 3. \quad (49)$$

Figure 2:
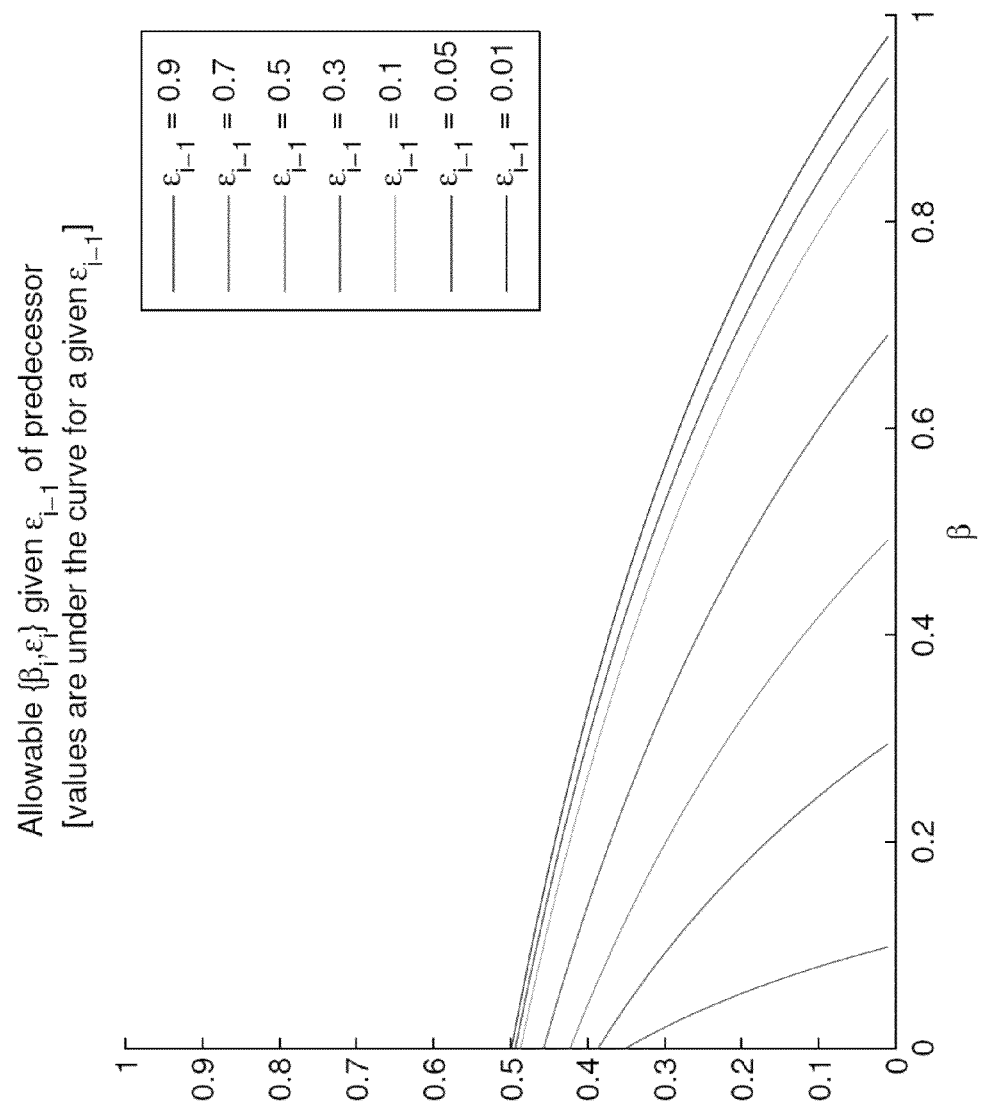
FIG. 2 is a plot of curves showing the limiting feasible values for $\{\beta_i, \epsilon_i\}$ that satisfy (49) at equality for various values of $\epsilon_{i-1}$. Values below each curve satisfy (49).

FIG. 2 shows values of $\{\beta_i,\varepsilon_i\}$ that satisfy (49) at equality for various values of $\varepsilon_{i-1}$. Thus, all values below each curve satisfy the inequality (49).

Each vehicle computes its values of $\{\beta_i,\varepsilon_i\}$ upon receiving $\{\xi_{i-1}=\varepsilon_{i-1},\gamma_{i-1}\}$ from its predecessor. Therefore, the choice of values by each vehicle must occur sequentially down the platoon at the time of platoon formation, as described in Section VI. The choices available to the vehicle will depend on the choices made by vehicles ahead of it in the platoon.

As stated, our condition of Predecessor-Follower string stability ensures Leader-Follower string stability. Although the constraint (36) has the computed trajectory on both sides of the inequality, the right hand side could be simplified to be $$\min\{|\hat{q}_{i-1,e}(t;t_{k+1})|_{\infty,\delta}, q_{i,e}(t_{k+1})\}.$$

since $|q_{i,e}^P(t;t_{k+1})|_{\infty,\delta} \ge q_{i,e}^P(t_{k+1};t_{k+1})$, and string stability would still apply. The constraint (36) would then be linear in the computed trajectory $q_{i,e}^P$, which would simplify its implementation.

V. Simulations

The simulations explore tradeoffs in the move suppression $F_i$ and predecessor-relative error $G_i$ cost weights, and their affect on stability and string stability. The move suppression cost is a soft-form of the position error constraints used in the previous section to prove string stability. For a 7-car platoon simulation, the platoon starts from equilibrium and then at time t=1 second, the lead car requires a desired speed increase from 25 m/sec to 26 m/sec. Thus, t=1 is the "time t=0" referred to in the definitions and algorithms presented previously. A horizon of T=5 seconds and update period of $\delta$=0.5 seconds are used. We consider the nonlinear (quadratic drag) error dynamics $$m_i \ddot{q}_{i,e} = u_i + c_i \dot{q}_{i,e}^2,$$

setting $m_i$=1841 kg (4000 lbs) and $c_i$=0.41 N/m. In the cost defined in Problem III.1, we have $Q_i$=diag(0.5, 1). Differential flatness in the error dynamics is used to formulate a discretized optimization problem for the variables $\{q_{i,e}^P(t_j), \dot{q}_{i,e}^P(t_j), \ddot{q}_{i,e}^P(t_j)\}_{j=1,\ldots,M}$, with $u_i^P = m_i \ddot{q}_{i,e} + c_i \dot{q}_{i,e}^2$. Details on how flatness and the discretization are done are provided here [20]. The weight on the control is $R_i = 10^{-5}$, chosen so that the size of the control penalty (proportional to $m_i^2$) is comparable to the $Q_i$ cost terms during the transient response. We employ the fmincon nonlinear programming problem solver in Matlab. The fmincon solver uses sequential quadratic programming. Although solutions may be locally optimal, we accept this limitation for the purpose of illustrating our control algorithm. The table below (Table I) summarizes results for different values for the matrices $F_i$ and $G_{i+1}$, considering whether the sufficient condition for stability (9) in Lemma IV.2 is satisfied, and also if the definitions of leader-follower (L-F) and predecessor-follower (P-F) string stability are satisfied.

TABLE I

STABILITY AND STRING STABILITY TRADE-OFFS FOR VARYING VALUES FOR MOVE SUPPRESSION AND PREDECESSOR-RELATIVE ERROR MATRICES $F_i$ AND $G_{i+1}$, i = 1, ..., $N_v$ - 1. THESE ARE 2 × 2 DIAGONAL MATRICES, WITH GAINS ON THE DIAGONAL EQUAL TO THE VALUES SHOWN. L-F S.S. AND P-F S.S. REFER TO LEADER-FOLLOWER AND PREDECESSOR-FOLLOWER STRING STABILITY, RESPECTIVELY.

| Row | $F_i$ | $G_{i+1}$ | satisfies (9) | L-F s.s. | P-F s.s. |
|-----|-------|-----------|---------------|----------|----------|
| (a) | 10/i  | 10/i      | Yes           | No       | No       |
| (b) | 10    | 10        | Yes           | Yes      | Yes      |
| (c) | 1     | 20        | No            | Yes      | Yes      |
| (d) | 0     | 50        | No            | Yes      | Yes      |
| (e) | 0     | i + 1     | No            | Yes      | Yes      |

Although rows (c)-(e) do not satisfy the sufficient conditions for stability in (9), all closed-loop responses converged and met the control objective. Interestingly, the L-F and P-F string stability margins improve from rows (b)-(d), that is, as the ratio $G_{i+1} = F_i$ is increased, and row (e) exhibits the most string stable response. Rows (b)-(d) exhibit P-F gain convergence to $\alpha$=1 for cars i≥4. On the other hand, scheduling the diagonal gain for $G_{i+1}$ as i+1, as shown in row (e), maintains a P-F gain of less than 1 for all seven cars. Specifically, defining the gain $\alpha_{i,j} = \max_{t \ge 0} |q_{i,e}(t)| / \max_{t \ge 0} |q_{j,e}(t)|$ for $1 \le i < j \le N_v$, the L-F gains ($\alpha_{1,j}$) for row (e) are ($\alpha_{1,2}$, $\alpha_{1,3}$, $\alpha_{1,4}$, $\alpha_{1,5}$, $\alpha_{1,6}$, $\alpha_{1,7}$)=(0.97460, 0.96165, 0.95614, 0.95240, 0.94965, 0.94754), and the P-F gains ($\alpha_{1,i+1}$) are ($\alpha_{2,3}$, $\alpha_{3,4}$, $\alpha_{4,5}$, $\alpha_{5,6}$, $\alpha_{6,7}$)=(0.98672, 0.99426, 0.99610, 0.99711, 0.99777).

Figure 3:
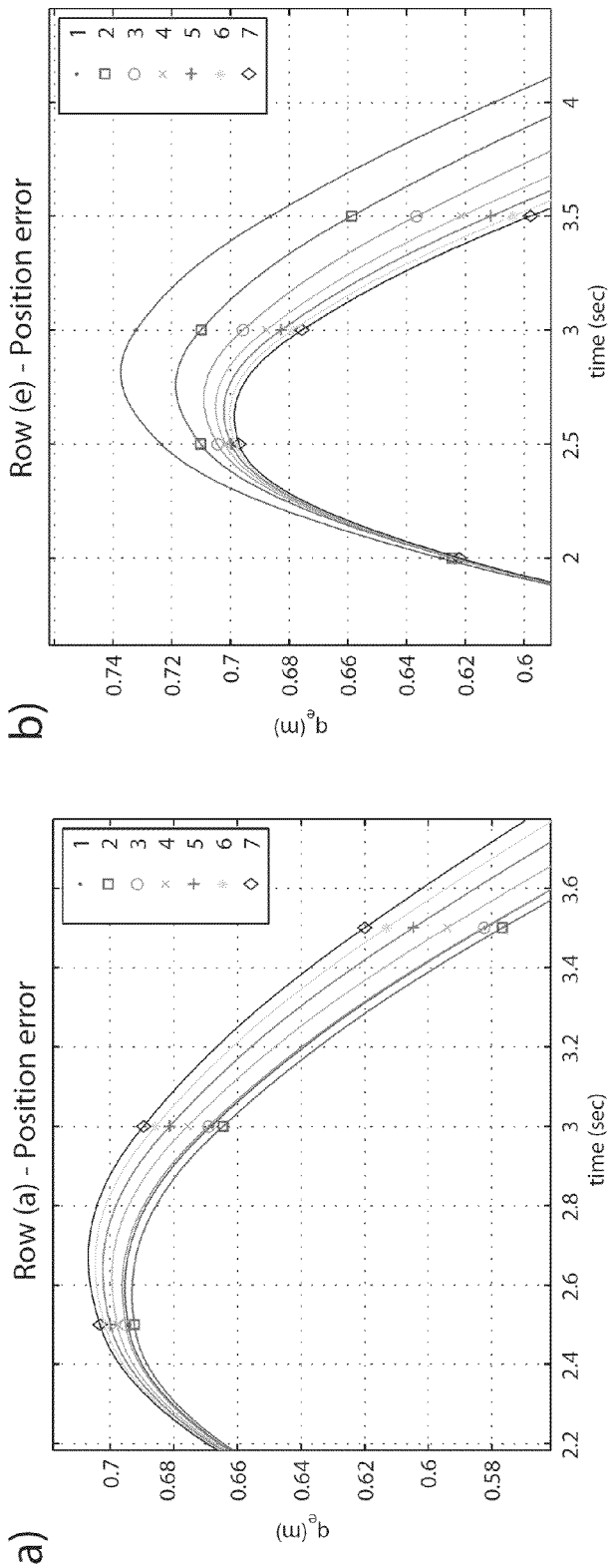
FIGS. 3(a) and 3(b) are plots of close-up of position error trajectories $q_{i,e}$ during their maximum values for Table I parameter values corresponding to (a) the string unstable response of row (a), and (b) the leader-follower and predecessor-follower string stable response of row (e).
Figure 4:
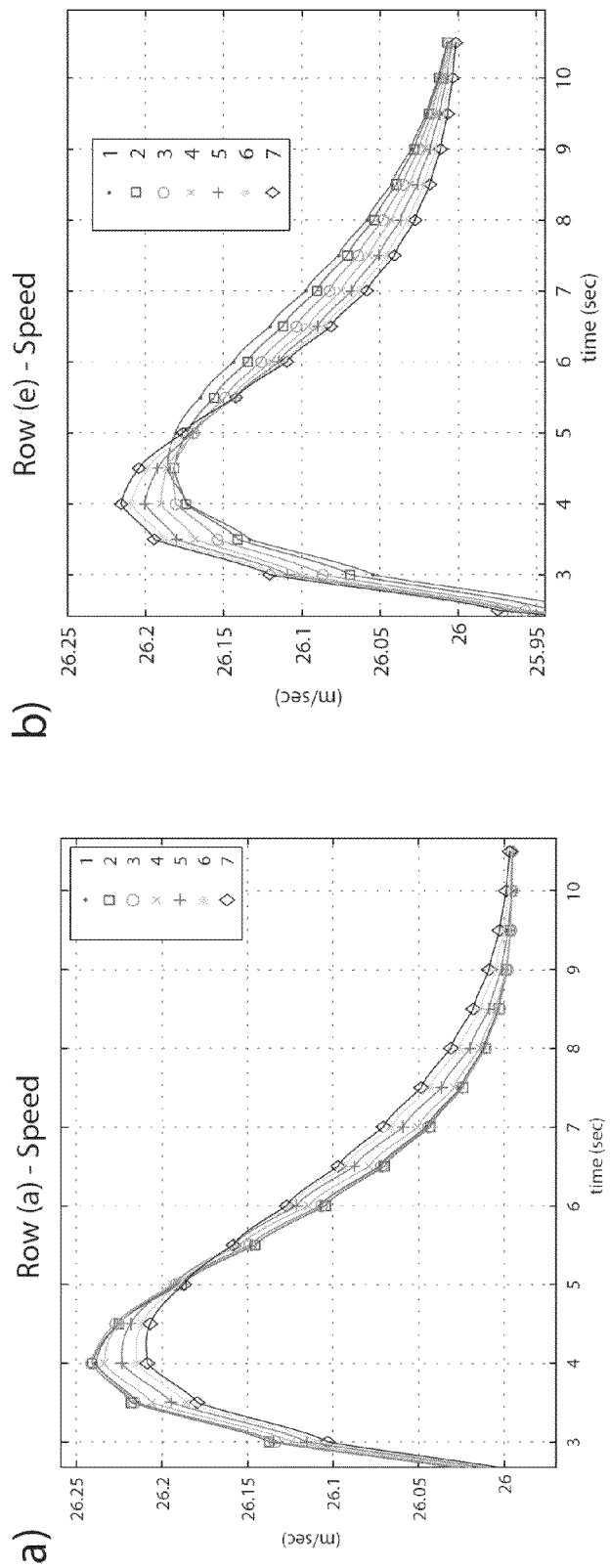
FIGS. 4(a) and 4(b) are plots of convergence of the closed-loop speed trajectories $\dot{q}_i$ during the speed increase from 25-26 msec, again for Table I parameter values corresponding to (a) row (a), which is not string stable, and (b) row (e) which is leader-follower and predecessor-follower string stable.
Figure 5:
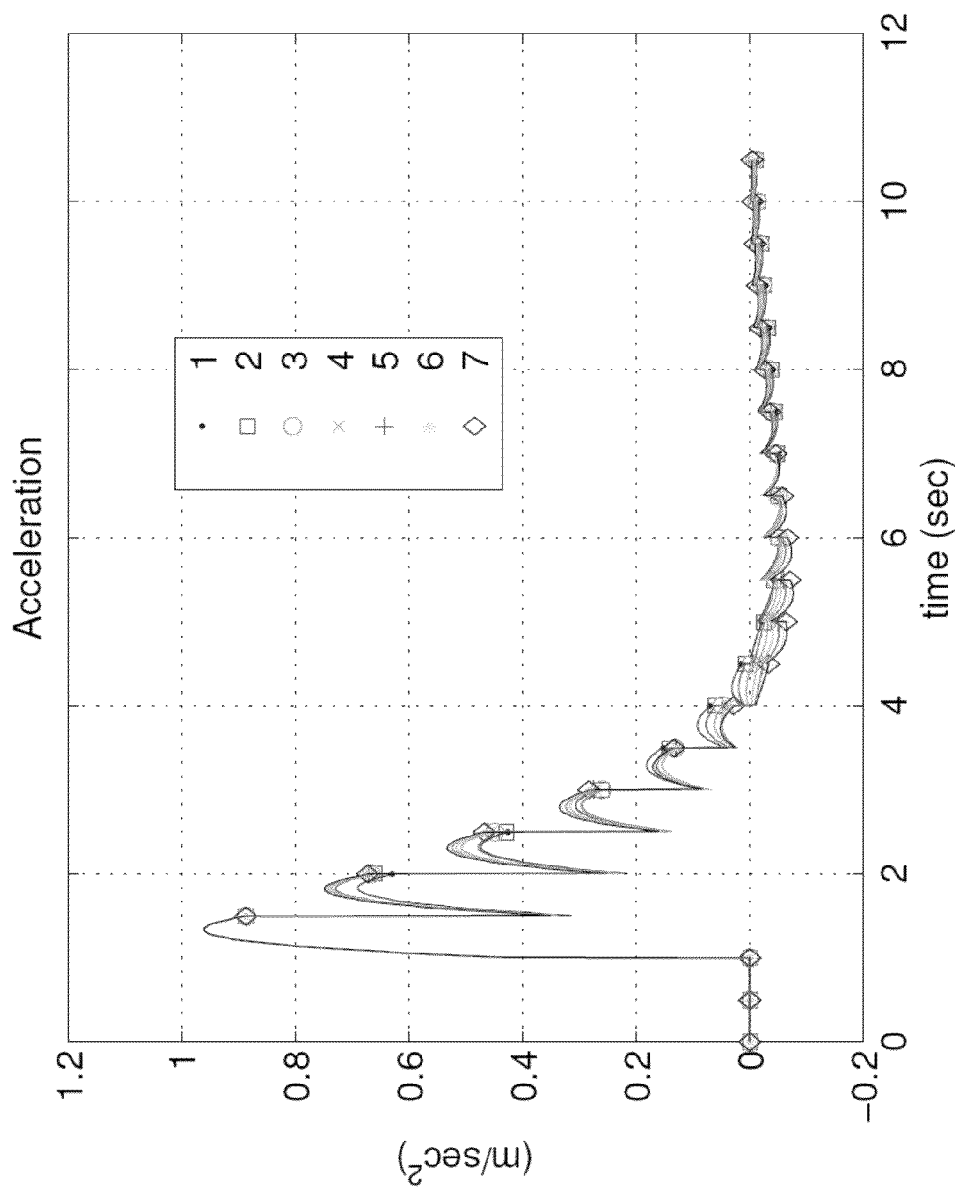
FIG. 5 is a plot of closed-loop acceleration trajectories $\ddot{q}_i$ before, during and after the speed increase from 25-26 m/sec at time t=1 second. Parameter values correspond to the string stable case of row (e) in Table I.

Closed-loop position errors for rows (a) and (e) are zoomed near their maximum and plotted in FIG. 3. Closed-loop speed trajectories for rows (a) and (e) are zoomed and plotted in FIG. 4. Observe that the speed of the following cars "leads" that of the preceding cars, when string stability is satisfied (FIG. 4b). This trend is consistent with the performance of other string stable controllers. The closed-loop acceleration trajectories $\ddot{q}_i$ are plotted in FIG. 5. Consistent with the speed trend in FIG. 4b, the acceleration of vehicle 7 "exceeds" that of the preceding cars in the string stable response. Closer inspection of the response shows that the diamond (symbol for car 7 plotted at the update times) is further from the origin (more aggressive) during peak acceleration and deceleration. The acceleration for car 7 is also the first to converge to $\approx 0$ m/sec$^2$, showing the superior performance of the last car in the platoon. Simulations for row (e) in Table I took 9.36 seconds to execute for 20 receding horizon updates, with vehicle's update computed serially. This corresponds to an average of 67 milliseconds per vehicle to execute steps 2-5 in the controller logic of Algorithm III.1, supporting the feasibility of real-time implementation using an update period of 0.5 seconds.

In other simulations, $G_i \rightarrow 0$ and $F_i \rightarrow F$, a constant, results in all vehicles exhibiting a closed-loop response that is consistent with the response computed at initialization. Thus, simulations suggest that a string stabilizing initial response could be preserved as such using the $F_i$ costs alone. These trends are consistent with the form of the constraints (move suppression on the position error) used to prove L-F and P-F string stability in the theoretical sections.

VI. Platoon Formation

Constraints in the optimal control problems of the controllers (Algorithms IV.1-IV.3) provided sufficient conditions for leader-follower and predecessor-follower string stability. Simulations in the previous section showed that these constraints are not necessary to achieve string stability. In this section and the next, we presume that the predecessor-follower string stable controller (Algorithm IV.3) is implemented, and examine practical aspects of platoon formation and size. Before the first execution of Algorithm IV.3, a platoon that satisfies Theorem 4 must be formed by available cars, vans, and trucks. The choice of a leader is not discussed here and the order of the available cars behind this leader is assumed given. We remark only that, in light of our analysis below, the choice of a leader is not trivial because the leader will reap less reward from the platoon than other members; incentives for being a leader must be considered. To simplify the formation of the platoon, we again set $\xi_i = \epsilon_i$ to allow computation of $\gamma_i$ using (37) after $\{\beta_i, \epsilon_i\}$ are chosen by vehicle i.

1) The leader chooses its epsilon $\epsilon_1$ and communicates this value to the second vehicle. As shown in Section VII, a leader that chooses a small epsilon can lead longer platoons than a leader with a larger epsilon.

2) The second vehicle looks at FIG. 2 and chooses $\{\beta_2, \epsilon_2\}$ that are good for its vehicle type (e.g., car, truck) and such that (41) holds for Predecessor-Follower stability (i.e., they are under the curve for the chosen $\epsilon_{i-1} = \epsilon_1$ in FIG. 2). If the second vehicle desires relaxed move suppression constraints, it will choose $\epsilon_3$ as large as possible at the expense of $\beta_2$ being smaller. This will reduce $\gamma_2$ more than if the second vehicle chooses $\epsilon_2$ as small as possible. However, relaxed move suppression constraints provide the vehicle increased flexibility to modify its trajectory based on its drive-train characteristics.

3) To ensure Predecessor-Follower stability, the second vehicle calculates $\gamma_2 = \beta_2/(1+\epsilon_2)$ and passes $\{\epsilon_2, \gamma_2\}$ to the third vehicle.

4) The third vehicle repeats step (2) using $\epsilon_{i-1} = \epsilon_2$.

5) To ensure Predecessor-Follower stability, the third vehicle calculates $\gamma_3 = \beta_3 \gamma_2 (1+\epsilon_2)/(1+\epsilon_3)$. Again, the larger the value for $\epsilon_3$ chosen by the third vehicle, the smaller the result for $\gamma_3$.

6) The third vehicle passes its $\{\epsilon_3, \gamma_3\}$ to the fourth vehicle.

7) Vehicles 4—$N_v$ repeat steps (4)-(6) until (35) cannot be satisfied realistically. This will determine the size of the platoon at formation. As noted, this size will depend on the order of the vehicles in the heterogeneous platoon. It will also depend on each vehicle's choice of $\{\beta_i, \epsilon_i\}$.

Using (35) to lower bound acceptable values of $\gamma_i$ and the monotonically decreasing nature of $\gamma_i$, as $i \rightarrow N_v$, implies that the size of the platoon is inversely related to the size of $\epsilon_i$ (i.e., the tightness of the move suppression constraints) chosen by the vehicles. Finally, the sequential process for choosing $\{\epsilon_i, \gamma_i\}$ is performed only at the time of platoon formation. Members of the platoon will use these values whenever there is a re-initialization to a new desired speed and until there is a re-configuration of the platoon (e.g., vehicles split from the platoon).

VII. Platoon Size

Given Algorithm IV.3, we now address the expected platoon size. It is assumed that (35) becomes unrealistic to satisfy when $\gamma_{N_v+1} < 0.01$. Table II summarizes an analysis performed using the platoon formation process in Section VI with $\xi_i = \epsilon_i$. From Table II, the tradeoff between move suppression flexibility and platoon size is apparent.

TABLE II

EXPECTED PLATOON SIZES GIVEN THAT $\gamma_i$ IS LOWER BOUNDED BY 0.01. LARGE PLATOON SIZES ARE POSSIBLE WHEN THE MOVE SUPPRESSION CONSTRAINT IS TIGHT. SMALL PLATOON SIZES EXIST WHEN EACH VEHICLE IS GIVEN SIGNIFICANT MOVE SUPPRESSION FREEDOM IN WHICH TO SOLVE ITS RECEDING-HORIZON OPTIMIZATION.

| Vehicle Types | Platoon Constitution | | Expected Number of Vehicles |
|---|---|---|---|
| | Move Suppression | Leader Move Suppression | |
| similar | tight | moderate-tight | 20-115 |
| similar | tight | loose | 10-60 |
| similar | moderate | tight | 3-4 |
| similar | moderate | loose-moderate | 2-3 |
| heterogeneous | moderate-tight | tight | 6-8 |
| heterogeneous | moderate-tight | loose-moderate | 2-5 |

From this tradeoff, the following recommendations are presented:

1) Efforts should be made to choose a leader with small $\epsilon_1$ and the ability to incorporate road geometry into its computed profiles. The whole platoon will benefit from fuel-efficient profiles from this type of leader.

2) For platoons focused on fuel-efficiency through drafting, long platoons are possible with tight move suppression. Truck platoons fall within this category where drafting provides more benefit than having each truck individually optimize its profile within the move suppression bounds for fuel savings.

3) For platoons focused on comfort (e.g., cooperative adaptive cruise control), move suppression should be relaxed to allow the vehicle to harness whatever eco-optimized benefit is possible. This type of platoon assumes that greater fuel efficiency is possible from modifying individual vehicle profiles within the move suppression bounds, than by tightly drafting behind other vehicles.

Figure 6:
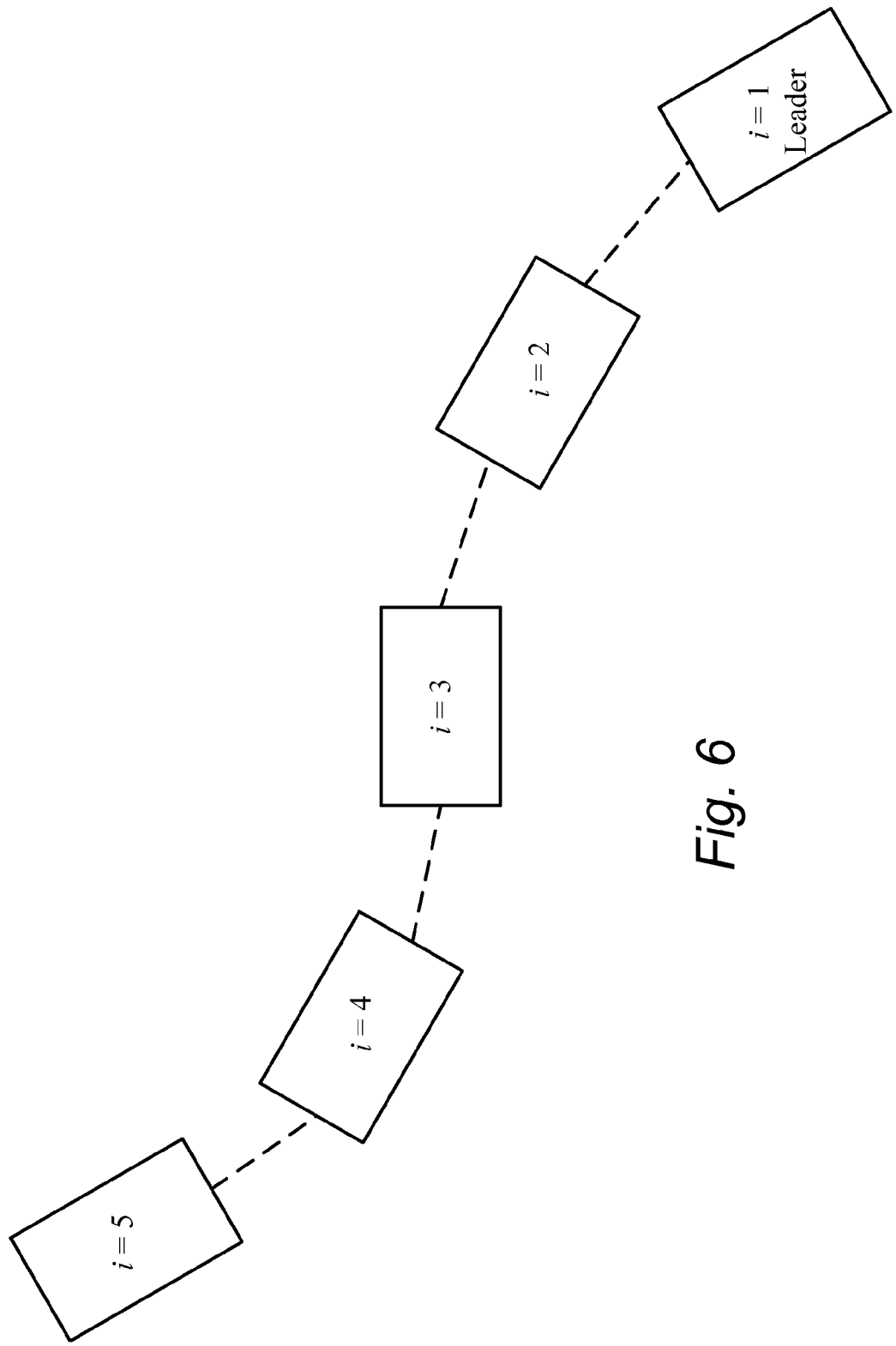
FIG. 6 is a schematic of an exemplary platoon of vehicles.

FIG. 6 shows an exemplary platoon of 5 vehicles ($N_v=5$, where $i=1, \ldots, N_v$ and $i=1$ is the leader). As discussed previously, the vehicles can include automobiles, trucks, vans, aerial vehicles and other vehicles implementing automated controls.

VIII. Conclusions

A distributed implementation of receding horizon control has been formulated to address vehicle platooning. Generality of the approach allows the subsystem dynamics to be nonlinear and heterogeneous, which is seen as a considerable benefit from an implementation point of view. Receding horizon control also affords the ability to handle other constraints on the states and inputs. In the distributed implementation described herein, updates occur in parallel within a common global clock period, but tasks within the period need not be synchronized. Moreover, neither computation nor communication is assumed to happen instantaneously. Stability of the approach is achieved through parametric conditions on the weights in the cost function of each local optimal control problem. By adding a move-suppression constraint in each local optimal control problem, the stabilizing controller becomes string stabilizing. It should also be noted that our string-stable controller does not require acceleration information from the lead car, nor does it require any continuous information from the lead car to cars down the string. This is in stark contrast with string-stable controllers that fundamentally require lead car acceleration in addition to position error and speed [22].

Procedures for platoon formation that ensure predecessor-follower string stability was described herein, and indicate that platoons between tens and hundreds of vehicles are possible. The size of a platoon is dependent upon the individual choices made by the constituent vehicles. Larger platoons are possible when vehicles behave homogeneously with tightly constrained paths, a trend consistent with the fact that methods derived for spatially invariant (homogeneous) systems are applicable to a countably infinite number of vehicles [10], [21].

IX. Discussion of Hardware Controllers

FIG. 7 schematically illustrates a processing system in accordance with this disclosure. Such a processing system is provided in each vehicle of a platoon. However, it is should be appreciated that identical processing systems in each vehicle is not necessary. Yet, providing each vehicle with the processing system allows the vehicles to process in parallel in accordance with this disclosure.

The processing system can be implemented using a microprocessor or its equivalent, such as a central processing unit (CPU) or at least one application specific processor ASP (not shown). The microprocessor utilizes a computer readable storage medium, such as a memory (e.g., ROM, EPROM, EEPROM, flash memory, static memory, DRAM, SDRAM, and their equivalents), configured to control the microprocessor to perform and/or control the processes and systems of this disclosure, including executed all or part of the equations and algorithms described herein in serial or parallel. Other storage mediums can be controlled via a controller, such as a disk controller, which can controls a hard disk drive or optical disk drive.

The microprocessor or aspects thereof, in an alternate embodiment, can include or exclusively include a logic device for augmenting or fully implementing the algorithms and processes presented in this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit form parallel processing capabilities of a multi-cored CPU.

In another aspect, results of processing in accordance with this disclosure can be displayed via a display controller to a monitor (e.g., allowing a driver to perceive a status of platoon control or to confirm commands from a lead vehicle). The display controller would then preferably include at least one graphic processing unit for improved computational efficiency. Additionally, an I/O (input/output) interface is provided for inputting sensor data from Sensors 1, 2 ... N, which collect data relating to vehicle positioning (either, own or other vehicle positioning).

Further, as to other input devices, the same can be connected to the I/O interface as a peripheral. For example, a keyboard or a pointing device (not shown) for controlling parameters of the various processes and algorithms of this disclosure can be connected to the I/O interface to provide additional functionality and configuration options, or control display characteristics. Moreover, the monitor can be provided with a touch-sensitive interface to a command/instruction interface.

The above-noted components can be coupled to a network, as shown in FIG. 7, such as the Internet or a local intranet, via a network interface for the transmission or reception of data, including controllable parameters. The network can also be a vehicle-centric network such as a vehicle local area network. In such an implementation, vehicle path prediction can be routed by packets to automated vehicle equipment to control steering, throttle and braking for purposes of platoon control and collision avoidance via the vehicle local area network. That is, the control path for the platoon can be executed by transmitting appropriate commands and instructions to the automated vehicle equipment. Other implementations include safety warnings and driver assistance. Also, a central BUS is provided to connect the above hardware components together and provides at least one path for digital communication there between.

A subject vehicle can also be connected to other vehicles in the platoon via the network, either via the Internet or a proprietary private network. Also, vehicle communications can also be performed by radio communications which do not rely specifically on an Internet-based network. Such communications can rely on GSM, CDMA or LTE-based communications, and can involve relaying via a base station or other intermediary device. Otherwise, communication can be performed directly by various methods capable of transferring data between devices.

Figure 8A:
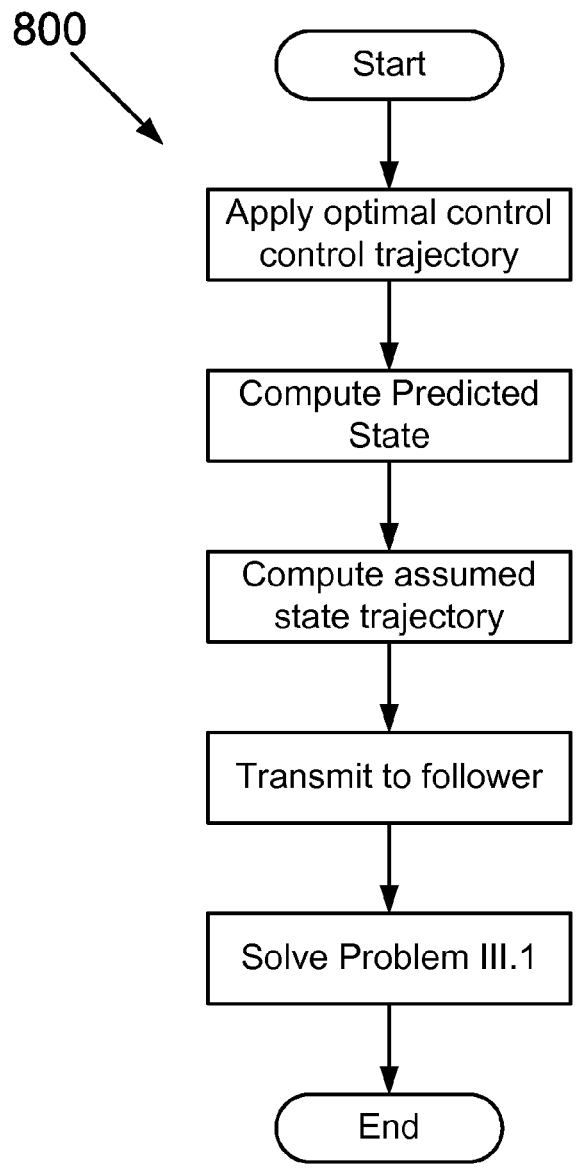
FIGS. 8A and 8B are flowcharts of algorithms implementing aspects of this disclosure.
Figure 8B:
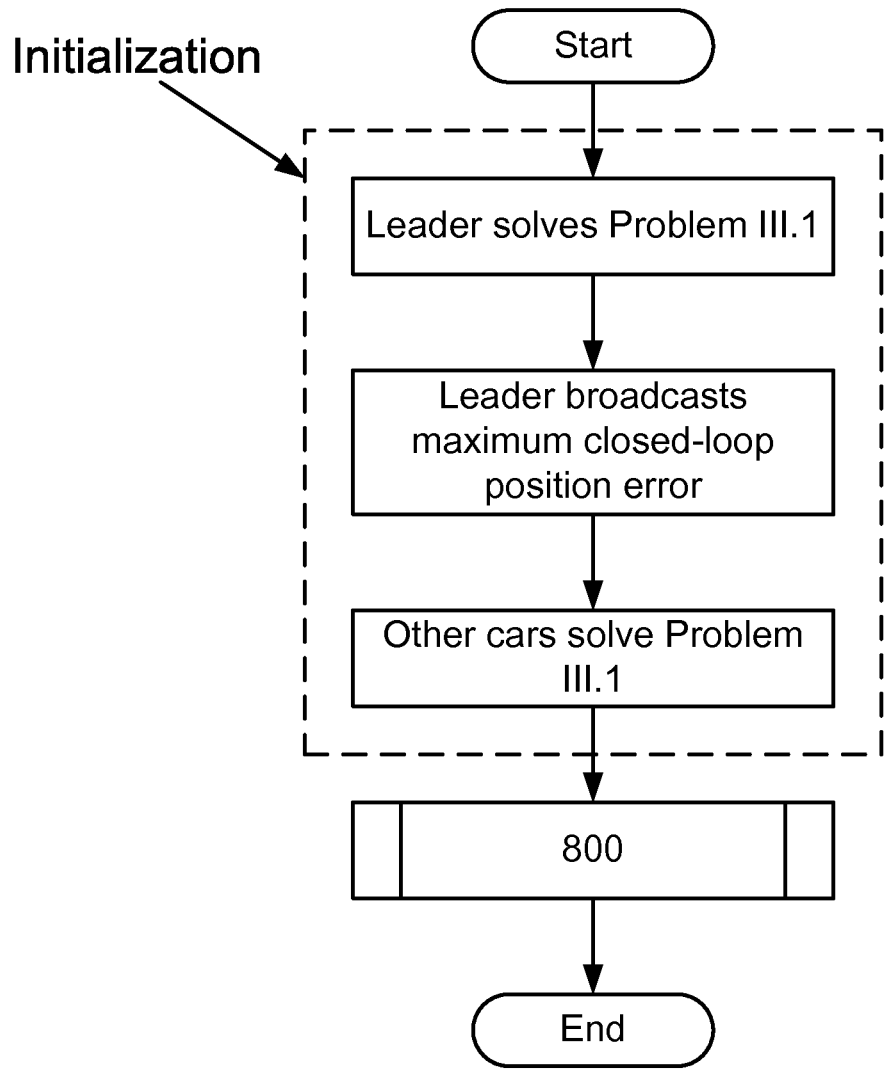

FIG. 8A shows an algorithm 800 implementing one embodiment of this disclosure in accordance with Algorithm III.1 discussed above (i.e. steps 1-5), which involves the processing of at least one processing system, such as that shown in FIG. 7. FIG. 8B is generic to Algorithm IV.1, IV.2 and IV.3, discussed above, and variations thereof. FIG. 8B illustrates initialization. FIGS. 8A-B involve steps which may be performed by a single controller or by a plurality of controllers operating in parallel or in a partially sequential manner, in accordance with the descriptions provided above.

Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary embodiments of this disclosure in which functions may be executed out of order from that shown or discussed, including substantially concurrently or in reverse order, depending upon the functionality involved.

Moreover, as will be recognized by a person skilled in the art with access to the teachings of this disclosure, several combinations and modifications of the aspects of this disclosure can be envisaged without leaving the scope of this disclosure. Thus, numerous modifications and variations of this disclosure are possible in light of the above teachings, and it is therefore to be understood that within the scope of the appended claims, this disclosure may be practiced otherwise than as specifically described herein.

The invention claimed is:

1. A controller for a vehicle i within a platoon, the controller comprising:
   a computer processor, which is configured to execute instructions stored on a memory to calculate a local optimal control problem, velocity control of the vehicle i, and a position and velocity error trajectory for the vehicle i; and
   a communication terminal configured to receive a position and velocity error trajectory for an immediately preceding vehicle i−1 from the immediately preceding vehicle i−1, and to transmit the position and velocity error trajectory calculated by the computer processor for the vehicle i to an immediately following vehicle i+1.

2. The controller according to claim 1, wherein the computer processor is configured to calculate the local optimal control problem, repeatedly, to optimize control of the vehicle i during each of successive update periods.

3. The controller according to claim 2, wherein:
   the communication terminal receives a communication from a leader vehicle, where the leader vehicle is not the immediately preceding vehicle i−1, only at initialization of platoon control, and
   the communication terminal receives the position and velocity error trajectory for only the immediately preceding vehicle i−1 and transmits the position and velocity error trajectory for the vehicle i to only the immediately following vehicle i+1 during each of the update periods following initialization.

4. The controller according to claim 3, wherein the initialization is caused by a change in a desired speed, and at the initialization, the communication terminal receives a new desired speed broadcast by the leader vehicle.

5. The controller according to claim 4, wherein the local optimal control problem includes cost terms including a move suppression (MS) term and a predecessor relative (PRE) term.

6. The controller according to claim 5, wherein, upon an initialization, the MS term and the PRE term are both set to 0, and the local optimal control problem is solved by the processor using the new desired speed.

7. The controller according to claim 5, wherein:
   upon an initialization, the communication terminal receives an optimal predicted state trajectory and the a new desired speed from the leader vehicle, and
   the processor solves the local optimal control problem, based on the optimal predicted state trajectory received from the leader vehicle, the new desired speed, and by setting MS=0 and PRE>0.

8. The controller according to claim 5, wherein:
   upon an initialization, the communication terminal receives an optimal predicted state trajectory and a new desired speed from the leader vehicle, and
   the processor solves the local optimal control problem, based on the maximum closed-loop position error of the leader vehicle received from the leader vehicle, the new desired speed, and by setting MS=PRE=0.

9. The controller according to claim 2, wherein the position and velocity error trajectory for the vehicle i is calculated based on a trajectory expected to be implemented by the vehicle i over each respective update period.

10. A method for controlling a vehicle i within a platoon, the method comprising
    receiving a position and velocity error trajectory for an immediately preceding vehicle i−1 from the immediately preceding vehicle i−1;
    calculating a local optimal control problem and velocity control of the vehicle i based on the received position and velocity error trajectory for the immediately preceding vehicle i−1;
    calculating a position and velocity error trajectory for the vehicle i; and
    transmitting the calculated position and velocity error trajectory for the vehicle i to an immediately following vehicle i+1.

11. A platoon control system comprising:
    a plurality of vehicles arranged in a platoon configuration, each vehicle (i=1, . . . , $N_v$) including a controller including:
        a computer processor, which is configured to execute instructions stored on a memory to calculate a local optimal control problem, including velocity control of the vehicle i, and to calculate a position and velocity error trajectory for the vehicle i; and
        a communication terminal configured to receive a position and velocity error trajectory for an immediately preceding vehicle i−1 when i>1, and transmit the position and velocity error trajectory calculated by the computer processor for the vehicle i to an immediately following vehicle i+1 when i<$N_v$, wherein
    a leader vehicle i=1 starts an initialization to initiate an update period to change a desired speed, and broadcasts to all other vehicles of the platoon, only at the initialization, a new desired speed broadcast by the leader vehicle.

12. The controller according to claim 11, wherein the local optimal control problem includes cost terms including a move suppression (MS) term and a predecessor relative (PRE) term.

13. The system according to claim 12, wherein:
    upon the initialization, the leader vehicle solves the local optimal control problem based on the new desired speed by setting the MS term and the PRE term both to 0, and broadcasts optimal predicted state trajectories to the communication terminals of the other vehicles, and
    the processors of the other vehicles solves the respective local optimal control problem, based on the optimal predicted state trajectory received from the leader vehicle, the new desired speed, and by setting MS=0 and PRE>0.

14. The system according to claim 12, wherein:
    upon the initialization, the leader vehicle solves the local optimal control problem based on the new desire speed by setting the MS term to 0, and broadcasts a maximum closed-loop position error of the leader vehicle to the communication terminals of the other vehicles, and the processors of the other vehicles solve the respective local optimal control problem, based on the maximum closed-loop position error of the leader vehicle received from the leader vehicle, the new desired speed, and by setting MS=PRE=0.

15. The system according to claim 11, wherein the vehicles i transmit and receive updates of respective position and velocity error trajectories in parallel during the update period.

16. The system according to claim 11, wherein the leader vehicle i=1 only transmits broadcasts to all of the other vehicles i in the platoon when an initialization is performed to initiate an update period to change a desired speed to a new desired speed.

* * * * *

UNITED STATES PATENT AND TRADEMARK OFFICE
CERTIFICATE OF CORRECTION

| | |
|---|---|
| PATENT NO. | : 8,620,517 B2 |
| APPLICATION NO. | : 13/401090 |
| DATED | : December 31, 2013 |
| INVENTOR(S) | : Derek Stanley Caveney et al. |

It is certified that error appears in the above-identified patent and that said Letters Patent is hereby corrected as shown below:

On the title page, Item (73), the Assignee's Information is incorrect. Item (73) should read:

--(73) Assignee: Toyota Motor Engineering & Manufacturing North America, Inc., Erlanger, KY (US)--

Signed and Sealed this
First Day of April, 2014

Michelle K. Lee
*Deputy Director of the United States Patent and Trademark Office*